United States Patent
Gupta et al.

(10) Patent No.: US 12,488,443 B2
(45) Date of Patent: Dec. 2, 2025

(54) METHOD AND ELECTRONIC DEVICE FOR ENHANCING IMAGE QUALITY

(71) Applicant: Samsung Electronics Co., Ltd., Suwon-si (KR)

(72) Inventors: Vipul Gupta, Noida (IN); Ankur Agrawal, Noida (IN); Vaibhav Negi, Noida (IN); Rahul Agrawal, Noida (IN)

(73) Assignee: Samsung Electronics Co., Ltd., Suwon-si (KR)

(*) Notice: Subject to any disclaimer, the term of this patent is extended or adjusted under 35 U.S.C. 154(b) by 412 days.

(21) Appl. No.: 17/955,979

(22) Filed: Sep. 29, 2022

(65) Prior Publication Data
US 2023/0196537 A1    Jun. 22, 2023

Related U.S. Application Data

(63) Continuation of application No. PCT/KR2022/012857, filed on Aug. 29, 2022.

(30) Foreign Application Priority Data

Dec. 16, 2021 (IN) .............................. 202141058689

(51) Int. Cl.
*G06T 7/00* (2017.01)
*G06T 5/73* (2024.01)
(Continued)

(52) U.S. Cl.
CPC .............. *G06T 7/0002* (2013.01); *G06T 5/73* (2024.01); *G06T 5/80* (2024.01); *G06T 7/13* (2017.01);
(Continued)

(58) Field of Classification Search
CPC .......... G06T 7/0002; G06T 5/73; G06T 5/80; G06T 7/13; G06T 7/194;
(Continued)

(56) References Cited

U.S. PATENT DOCUMENTS

| 7,423,781 B2 * | 9/2008 | Morimoto | ................. G06T 7/12 |
| | | | 358/2.1 |
| 9,516,160 B2 | 12/2016 | Assem et al. | |

(Continued)

FOREIGN PATENT DOCUMENTS

| CN | 102811354 A | 12/2012 |
| KR | 10-2019-0119548 A | 10/2019 |

OTHER PUBLICATIONS

Chang, Chia-Feng et al. "A Single Image Deblurring Algorithm for Nonuniform Motion Blur Using Uniform Defocus Map Estimation", Feb. 13, 2017 [retrieved on Dec. 13, 2024], Mathematical Problems in Engineering [online], 2017. Retrieved from Wiley Online Library: (Year: 2017) <URL: https://onlinelibrary.wiley.com/doi/10.1155/2017/6089650>. <DOI: https://doi.org/10.1155/2017/6089650>. (Year: 2017).*

(Continued)

*Primary Examiner* — Matthew C Bella
*Assistant Examiner* — Nicholas John Helco
(74) *Attorney, Agent, or Firm* — Jefferson IP Law, LLP

(57) ABSTRACT

A method for enhancing image quality using an electronic device is provided. The method includes receiving, by the electronic device, an image frame from a network, monitoring, by the electronic device, a network parameter of the network, determining, by the electronic device, a context of the electronic device, identifying, by the electronic device, a visual degradation in the image frame based on the monitored network parameter and the context of the electronic device, and modifying, by the electronic device, a (Continued)

visual quality factor of the image frame based on the visual degradation in the image frame for enhancing the image quality.

18 Claims, 16 Drawing Sheets

(51) Int. Cl.
  *G06T 5/80* (2024.01)
  *G06T 7/13* (2017.01)
  *G06T 7/194* (2017.01)
  *G06V 10/60* (2022.01)
  *G06V 10/74* (2022.01)

(52) U.S. Cl.
  CPC .............. *G06T 7/194* (2017.01); *G06V 10/60* (2022.01); *G06V 10/761* (2022.01); *G06T 2207/10024* (2013.01); *G06T 2207/20192* (2013.01); *G06T 2207/20201* (2013.01); *G06T 2207/30168* (2013.01)

(58) Field of Classification Search
  CPC . G06T 2207/10024; G06T 2207/20192; G06T 2207/20201; G06T 2207/30168; G06T 5/90; G06T 7/12; G06T 2207/10016; G06T 2207/30201; G06V 10/60; G06V 10/761; G06V 10/44; G06V 10/993; H04N 21/234354; H04N 21/4402; H04N 21/44; H04N 21/440227; G11B 20/18; G11B 2020/1823; G11B 2020/1826; G06F 3/0617; G06F 2209/503; G06F 2209/504; G06F 2209/501; G06F 2209/5014; G06F 2209/5018; G06F 2209/5019; G06F 2209/5022; G06F 2209/508

See application file for complete search history.

(56) References Cited

U.S. PATENT DOCUMENTS

| | | | |
|---|---|---|---|
| 10,186,209 B1* | 1/2019 | Shah | G09G 3/20 |
| 10,778,978 B2* | 9/2020 | Rusanovskyy | H04N 19/98 |
| 10,810,742 B2 | 10/2020 | Guo et al. | |
| 10,958,874 B2 | 3/2021 | Astarabadi et al. | |
| 10,986,378 B2 | 4/2021 | Gupta et al. | |
| 2008/0068446 A1* | 3/2008 | Barkley | H04N 19/187 348/14.07 |
| 2009/0187960 A1 | 7/2009 | Lee et al. | |
| 2009/0213940 A1 | 8/2009 | Steinbach et al. | |
| 2009/0225170 A1* | 9/2009 | Yamagishi | H04N 19/61 348/192 |
| 2013/0055331 A1* | 2/2013 | Karacali-Akyamac | H04L 65/80 725/116 |
| 2014/0016696 A1* | 1/2014 | Nelson | H04N 19/50 375/E7.243 |
| 2015/0036051 A1 | 2/2015 | Broberg et al. | |
| 2016/0171676 A1 | 6/2016 | Kruglick | |
| 2016/0173819 A1 | 6/2016 | Kitazawa | |
| 2020/0084367 A1 | 3/2020 | Amini et al. | |
| 2020/0220907 A1 | 7/2020 | Cho et al. | |
| 2020/0241925 A1* | 7/2020 | Zhang | G06F 1/3287 |
| 2020/0374200 A1 | 11/2020 | Strom et al. | |
| 2021/0104021 A1 | 4/2021 | Sohn et al. | |
| 2021/0352357 A1 | 11/2021 | Park et al. | |
| 2022/0114717 A1* | 4/2022 | Drolia | H04N 23/71 |

OTHER PUBLICATIONS

International Search Report and written opinion dated Dec. 23, 2022, issued in International Application No. PCT/KR2022/012857.

Indian office Action dated May 1, 2024, issued in Indian Application No. 202141058689.

* cited by examiner

METHOD AND ELECTRONIC DEVICE FOR ENHANCING IMAGE QUALITY

CROSS-REFERENCE TO RELATED APPLICATION(S)

This application is a continuation application, claiming priority under § 365(c), of an International application No. PCT/KR2022/012857, filed on Aug. 29, 2022, which is based on and claims the benefit of an Indian patent application number 202141058689, filed on Dec. 16, 2021, in the Indian Intellectual Property Office, the disclosure of which is incorporated by reference herein in its entirety.

TECHNICAL FIELD

The disclosure relates to an electronic device. More particularly, the disclosure relates to a method and the electronic device for enhancing image quality.

BACKGROUND ART

Video call is one of most widely used forms of communication. Quality of a video in the video call at a receiving device decreases significantly due to transmission loss, transmission compressions, unstable/poor network conditions, insufficient light, frequent changes in surrounding lights, etc., making it nearly impossible for the receiving device to capture useful information from image frames of the video and resulting in a poor video calling experience.

FIG. 1 illustrates an example scenario of the video call established through a low quality network by an electronic device (e.g., a smartphone (10A)), according to the related art.

Referring to FIG. 1, consider an example scenario of a video call established between a user with a friend using the smartphone (10A). Consider, the user calls the friend using an electronic device (10B) via a network (13) with weak/fluctuating wireless signal. The electronic device (10B) receives a video (11) of the friend from the network (13). The electronic device (10B) displays a pixilated image (12A) of the friend with low quality due to the weak/fluctuating wireless signal of the network (13), which hinders a user experience. Thus, it is desired to provide a solution for enhancing image quality of the video/image frame.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide a method and an electronic device for enhancing image quality. The electronic device enhances the image quality by intelligently reducing an effect of deficits added into the image quality of a video receiving from a network due to transmission and network constraints as well as an ambience of the electronic device. Thus, irrespective of a factor that causes the image quality to be poor, the image quality is enhanced to look natural and of relatively higher quality.

Another aspect of the disclosure is to remove most disturbing distortions present in the video receiving at the electronic device in real-time by applying object enhancement or ambient light merging or deblurring of the image frames of the video.

Another aspect of the disclosure is to generate real-time frame enhancement which results into enhanced images that appear natural and pleasant to eyes of a user.

Additional aspects will be set forth in part in the description which follows and, in part, will be apparent from the description, or may be learned by practice of the presented embodiments.

Technical Solution

In accordance with an aspect of the disclosure, a method for enhancing image quality using an electronic device is provided. The method includes receiving, by the electronic device, an image frame from a network. The method includes monitoring, by the electronic device, a network parameter of the network. The method includes determining, by the electronic device, a context of the electronic device. The method includes identifying, by the electronic device, a visual degradation in the image frame based on the monitored network parameter and the context of the electronic device. The method includes modifying, by the electronic device, a visual quality factor of the image frame based on the visual degradation in the image frame for enhancing the image quality.

In an embodiment, where the network parameter comprises a bit rate, a frame rate, a packet loss rate, a bandwidth, a buffering rate, and a latency.

In an embodiment, where the visual degradation comprises flickering, jerkiness, floating, blocking, motion blurring, color bleeding, ringing, and pixelating.

In an embodiment, where the context of the electronic device comprises an ambient light, a display brightness, a display resolution, and resource availability of the electronic device.

In an embodiment, where identifying, by the electronic device, the visual degradation in the image frame based on the monitored parameter of the network and the context of the electronic device, comprises monitoring, by the electronic device, an image frame parameter of the image frame comprises an image compression of the image frame, an average size of the image frame, a resolution of the image frame, network carrying capabilities, and an application of the electronic device used for receiving the image frame, estimating, by the electronic device, a distortion in the image frame comprising a instantial distortion, a location distortion, and a network distortion based on the network parameter and the image frame parameter, mapping, by the electronic device, the distortion to a set of visual degradations of image frames, determining, by the electronic device, a score for each visual degradation based on the mapping, and identifying, by the electronic device, the visual degradation in the image frame with higher scores.

In an embodiment, where modifying, by the electronic device, the visual quality factor of the image frame based on the visual degradation in the image frame, comprises detecting, by the electronic device, the visual quality factor comprises edges of a foreground object, a brightness, and a blur motion effect of the image frame based on the visual degradation, performing, by the electronic device, sharpening the edges of the foreground object, and/or adjusting the brightness of the image frame, and/or adjusting position of pixels in the image frame that is affected by the blur motion effect, and embedding, by the electronic device, the image frame with the modified visual quality factor into the received image frame.

In an embodiment, where sharpening the edges of the foreground object, comprises performing low pass filtration and high pass filtration of the foreground object, determining a horizontal boundary, a vertical boundary, and a diagonal boundary of the filtered foreground object, segmenting the image frame into a plurality of segments, detecting edges of the foreground object in each segment, sharpening the edges corresponding to a contrast of a background of the image frame, and merging the horizontal boundary, the vertical boundary and the diagonal boundary of the foreground object with sharpened edges into the image frame.

In an embodiment, where adjusting the brightness of the image frame, comprises identifying an optimum reference ambient light value of the electronic device from an ambient light sensor of the electronic device, determining maximum and minimum channels of the image frame by applying maximum and minimum local Red Green Blue (RGB) patches on the foreground object, determining a difference of a current ambient light value and the optimum reference ambient light value based on the context of the electronic device, and modifying the maximum and minimum channels based on the difference of the current ambient light value and the optimum reference ambient light value.

In accordance with another aspect of the disclosure, an electronic device for enhancing the image quality is provided. The electronic device includes a visual quality factor controller, a memory, a processor, where the visual quality factor controller is coupled to the memory and the processor. The visual quality factor controller is configured for receiving the image frame from the network. The visual quality factor controller is configured for monitoring the network parameter of the network. The visual quality factor controller is configured for determining the context of the electronic device. The visual quality factor controller is configured for identifying the visual degradation in the image frame based on the monitored network parameter and the context of the electronic device. The visual quality factor controller is configured for modifying the visual quality factor of the image frame based on the visual degradation in the image frame for enhancing the image quality.

Other aspects, advantages, and salient features of the disclosure will become apparent to those skilled in the art from the following detailed description, which taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR INVENTION

Figure 1:
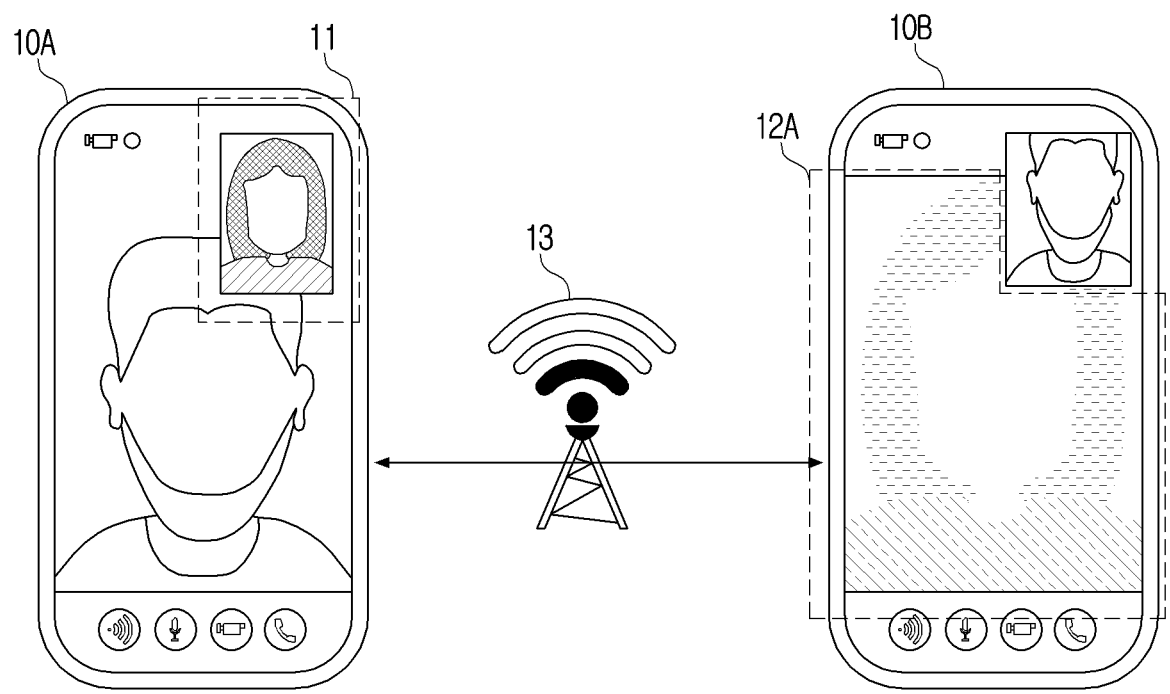
FIG. 1 illustrates an example scenario of a video call established through a low quality network by an electronic device, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein provide a method for enhancing image quality using an electronic device. The method includes receiving, by the electronic device, an image frame from a network. The method includes monitoring, by the electronic device, a network parameter of the network. The method includes determining, by the electronic device, a context of the electronic device. The method includes identifying, by the electronic device, a visual degradation in the image frame based on the monitored network parameter and the context of the electronic device. The method includes modifying, by the electronic device, a visual quality factor of the image frame based on the visual degradation in the image frame for enhancing the image quality.

Accordingly, the embodiments herein provide the electronic device for enhancing the image quality. The electronic device includes a visual quality factor controller, a memory, a processor, where the visual quality factor controller is coupled to the memory and the processor. The visual quality factor controller is configured for receiving the image frame from the network. The visual quality factor controller is configured for monitoring the network parameter of the network. The visual quality factor controller is configured for determining the context of the electronic device. The visual quality factor controller is configured for identifying the visual degradation in the image frame based on the monitored network parameter and the context of the electronic device. The visual quality factor controller is configured for modifying the visual quality factor of the image frame based on the visual degradation in the image frame for enhancing the image quality.

Unlike existing methods and systems, the proposed electronic device predicts a deficit added into image quality of a video prior to receiving the video from the network or storing the video based on the network parameters. Thus, the proposed method makes the proposed electronic device to be ready to immediately enhance the video upon receiving the video from the network.

Unlike existing methods and systems, the proposed electronic device enhances the image quality of the video based on the predicted network distortions, ambient factors such as ambient light, display brightness and contrast, etc. So that, a foreground object in the video will be clearly displayed and visible to a user.

Referring now to the drawings, and more particularly to FIGS. 2 to 6, 7A, 7B, and 8 to 15, there are shown preferred embodiments.

Figure 2:
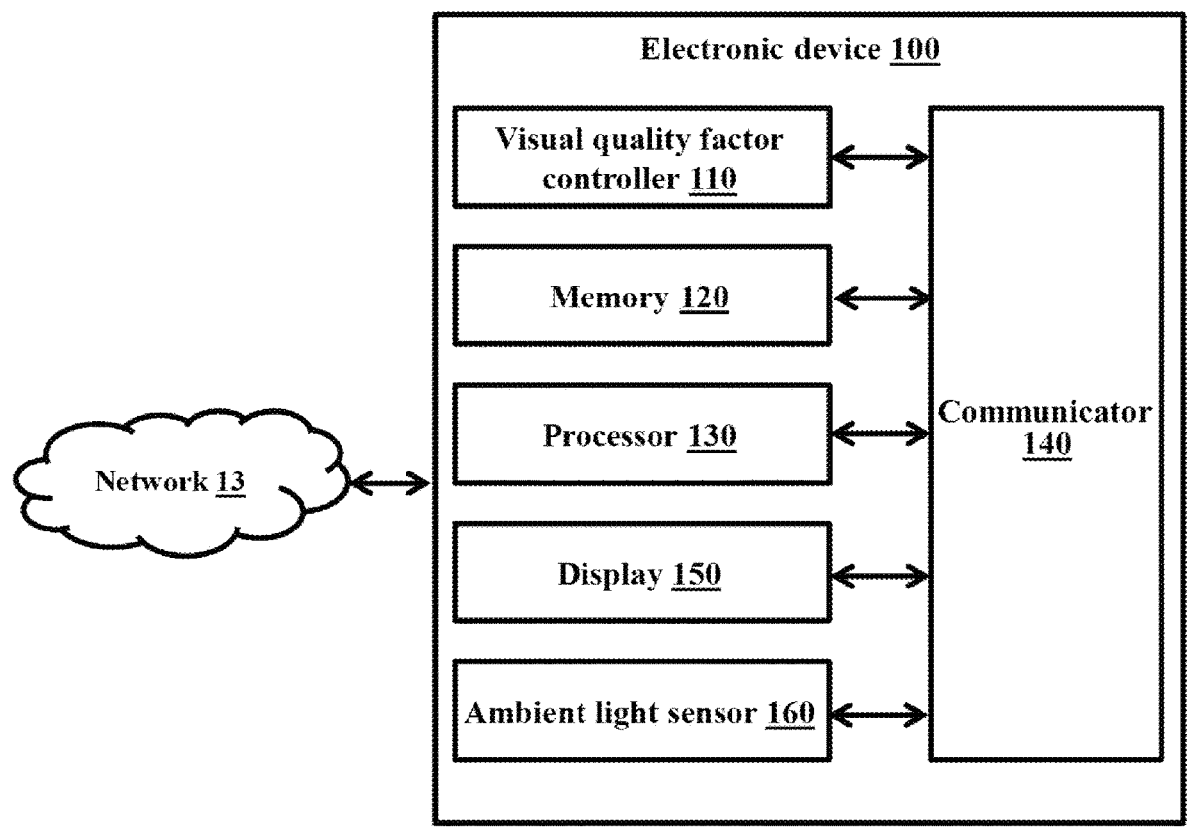
FIG. 2 is a block diagram of an electronic device for enhancing image quality, according to an embodiment of the disclosure.

FIG. 2 is a block diagram of an electronic device for enhancing image quality, according to an embodiment of the disclosure.

Referring to FIG. 2, an electronic device (100) is connected to a network (13). An example of the network includes, but is not limited to a mobile network, a Wi-Fi network, an edge network, internet, a cloud network, etc. An example of the electronic device (100) includes, but is not limited to a smartphone, a tablet computer, a Personal Digital Assistance (PDA), a desktop computer, an Internet of Things (IoT), a wearable device, etc. In an embodiment, the electronic device (100) includes a visual quality factor controller (110), a memory (120), a processor (130), a communicator (140), a display (150), and an ambient light sensor (160). An example of the display (150) includes, but is not limited to a liquid crystal display, a light-emitting diode display, etc. with touch sensing capabilities. The visual quality factor controller (110) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The visual quality factor controller (110) receives an image frame from the network (13). In an embodiment, the visual quality factor controller (110) receives image frames of a video from the network (13), where the visual quality factor controller (110) further process each image of the video. An example of the network can be but is not limited to a mobile network, a Wi-Fi network, an edge network, an internet, a cloud network, etc. In an embodiment, the visual quality factor controller (110) receives the image frame using an application installed in the electronic device (100). The visual quality factor controller (110) monitors a network parameter of the network (13) and the network parameter includes a bit rate, a frame rate, a packet loss rate, a bandwidth, a buffering rate, and a latency. In another embodiment, the visual quality factor controller (110) determines packets received from the network (13), lost packets, bits per second, a time increment, a packets size, a data size, packets per image, and a time scale for monitoring the network parameter.

The visual quality factor controller (110) determines the context of the electronic device (100) including an ambient light around the electronic device (100), a display brightness, a display resolution, and resource availability of the electronic device (100). The resource can be a computational resource such as the processor (130), a storage resource such as the memory (120), and a network resource such as the communicator (140) for accessing the network (13). The visual quality factor controller (110) identifies a visual degradation in the image frame based on the monitored network parameter and the context of the electronic device (100). An example of the visual degradation in the image frame includes, but is not limited to flickering, jerkiness, floating, blocking, motion blurring, color bleeding, ringing, pixelating, etc.

In an embodiment, the visual quality factor controller (110) monitors an image frame parameter of the image frame including an image compression of the image frame, an average size of the image frame, a resolution of the image frame, the network carrying capabilities, and an application of the electronic device (100) used for receiving the image frame. Further, the visual quality factor controller (110) estimates a distortion in the image frame including an Instantial Distortion (Di), a Location Distortion (Dlocation), and a Network Distortion (Dnetwork) based on the network parameter and the image frame parameter. Further, the visual quality factor controller (110) maps the distortion to a set of visual degradations of image frames listed in a mapping table (e.g., 801 in FIG. 8) stored in the memory (120). Further, the visual quality factor controller (110) determines a score for each visual degradation based on the mapping. Further, the visual quality factor controller (110) identifies the visual degradation in the image frame with higher scores.

The visual quality factor controller (110) detects a visual quality factor of the image frame including edges of a foreground object of the image frame, a brightness of the image frame, and a blur motion effect of the image frame based on the visual degradation in the image frame. The visual quality factor controller (110) modifies the visual quality factor of the image frame based on the visual degradation in the image frame for enhancing the image quality.

In an embodiment, for modifying the visual quality factor, the visual quality factor controller (110) sharpens the edges of the foreground object and/or adjusts the brightness of the image frame, and adjusts position of pixels in the image frame that is affected by the blur motion effect. Upon modifying the visual quality factor, the visual quality factor controller (110) embeds the image frame with the modified visual quality factor into the received image frame.

In an embodiment, for sharpening the edges of the foreground object, the visual quality factor controller (110) performs low pass filtration and high pass filtration of the foreground object. Further, the visual quality factor controller (110) determines a horizontal boundary, a vertical boundary, and a diagonal boundary of the filtered foreground object. Further, the visual quality factor controller (110) segments the image frame into a plurality of segments. Further, the visual quality factor controller (110) detects the edges of the foreground object in each segment. Further, the visual quality factor controller (110) sharpens the edges corresponding to a contrast of a background of the image frame. Further, the visual quality factor controller (110) merges the horizontal boundary, the vertical boundary, and the diagonal boundary of the foreground object with sharpened edges into the image frame.

In an embodiment, for adjusting the brightness of the image frame, the visual quality factor controller (110) identifies an optimum reference ambient light value of the electronic device (100) from the ambient light sensor (160). The optimum reference ambient light value is a display brightness value on which the user feels maximum comfort in a particular brightness of ambience. Further, the visual quality factor controller (110) determines maximum and minimum channels of the image frame by applying maximum and minimum local Red Green Blue (RGB) patches on the foreground object. Further, the visual quality factor controller (110) determines a difference between a current ambient light value and the optimum reference ambient light value based on the context of the electronic device (100). Further, the visual quality factor controller (110) modifies the maximum and minimum channels based on the difference of the current ambient light value and the optimum reference ambient light value.

The memory (120) stores the mapping table, where the mapping table includes a mapping between the distortion, the mapping table, and the context of the electronic device (100). The memory (120) stores instructions to be executed by the processor (130). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information than its storage space. In certain examples, a non-transitory storage medium may store data that can, over time, change (e.g., in Random Access Memory (RAM) or cache). The memory (120) can be an internal storage unit or it can be an external storage unit of the electronic device (100), a cloud storage, or any other type of external storage.

The processor (130) is configured to execute instructions stored in the memory (120). The processor (130) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (130) may include multiple cores to execute the instructions. The communicator (140) is configured for communicating internally between hardware components in the electronic device (100). Further, the communicator (140) is configured to facilitate the communication between the electronic device (100) and other devices via one or more networks (e.g., radio technology). The communicator (140)

includes an electronic circuit specific to a standard that allows wired or wireless communication.

Although the FIG. 2 shows the hardware components of the electronic device (100) but it is to be understood that other embodiments are not limited thereon. In other embodiments, the electronic device (100) may include less or more number of components. Further, the labels or names of the components are used only for illustrative purposes and does not limit the scope of the disclosure. One or more components can be combined together to perform same or substantially similar functions for enhancing the image quality.

Figure 3:
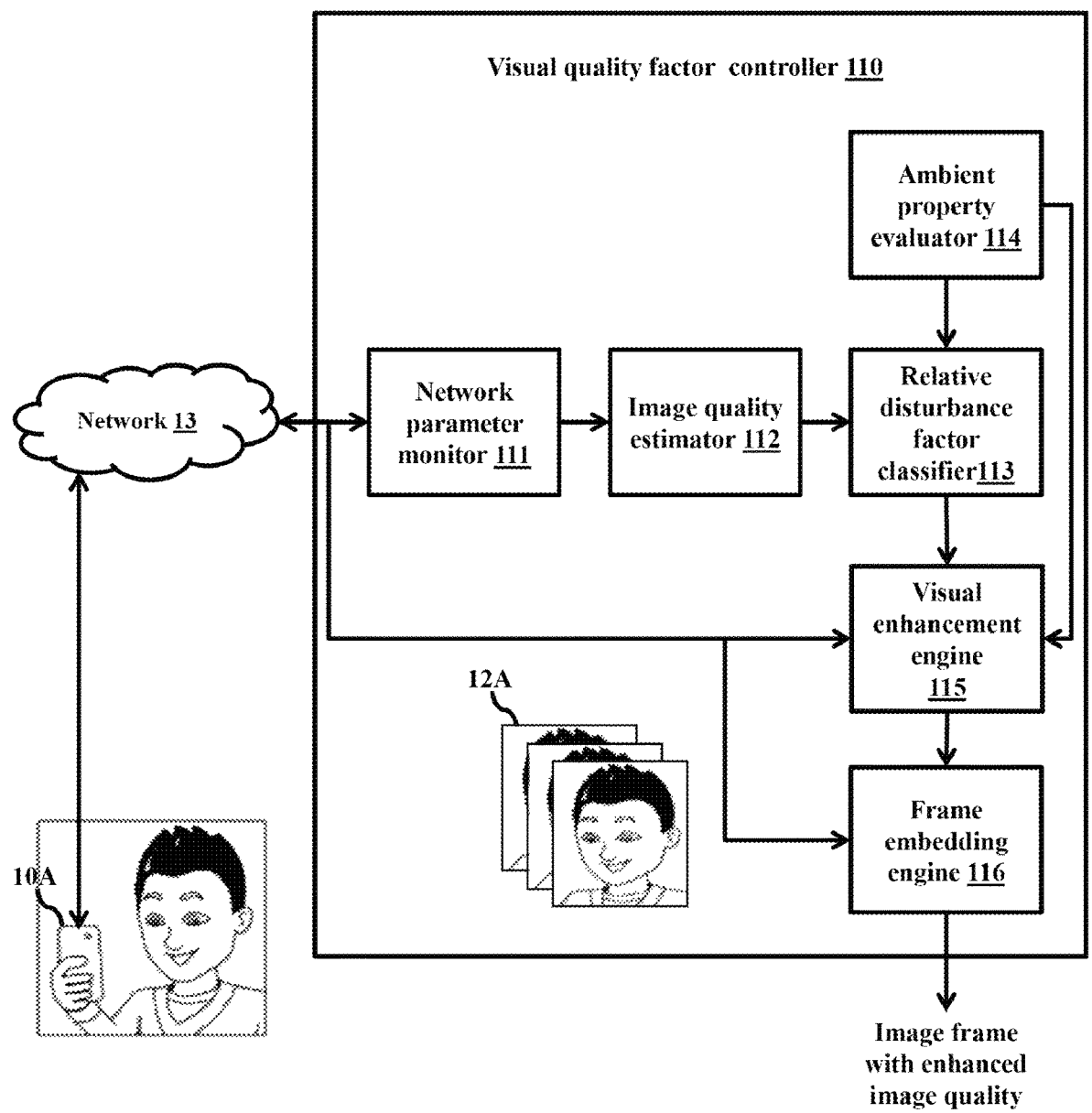
FIG. 3 is a block diagram of a visual quality factor controller for modifying a visual quality factor of an image frame based on a visual degradation in the image frame, according to an embodiment of the disclosure.

FIG. 3 is a block diagram of the visual quality factor controller for modifying the visual quality factor of the image frame based on the visual degradation in the image frame, according to an embodiment of the disclosure.

Referring to FIG. 3, a visual quality factor controller (110) includes a network parameter monitor (111), an image quality estimator (112), an ambient property evaluator (114), a relative disturbance factor classifier (113), a visual enhancement engine (115), and a frame embedding engine (116). The network parameter monitor (111), the image quality estimator (112), the ambient property evaluator (114), the relative disturbance factor classifier (113), the visual enhancement engine (115), and the frame embedding engine (116) are implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The network parameter monitor (111), the visual enhancement engine (115), and the frame embedding engine (116) receive the image frame from the network (13. The network parameter monitor (111) determines whether a value of the network parameter is high or low based on a threshold value, provides information of the high/low value of the network parameter to the image quality estimator (112), and monitors the network parameter of the network (13). In an example scenario, a person is doing a video call using the smartphone (10A) with a user of the electronic device (100) over the network (12). During the video call, the electronic device (100) receives the image frames of the video of the person from the electronic device (100) via the network (12). The network parameter monitor (111) determines whether a value of the network parameter is high or low based on a threshold value and provides information of the high/low value of the network parameter to the image quality estimator (112).

The image quality estimator (112) monitors the image frame parameter of the image frame. Further, the image quality estimator (112) estimates/predicts the distortion in the image frame based on the network parameter and the image frame parameter. Further, the image quality estimator (112) provides information on the estimated/predicted distortion to the relative disturbance factor classifier (113).

The ambient property evaluator (114) determines the context of the electronic device (100) and provides the context of the electronic device (100) to the relative disturbance factor classifier (113), and the visual enhancement engine (115).

The relative disturbance factor classifier (113) maps the distortion to the set of visual degradations of image frames listed in the mapping table. Further, the relative disturbance factor classifier (113) determines the score for each visual degradation based on the mapping. Further, the relative disturbance factor classifier (113) identifies the visual degradation in the image frame with higher scores. In an embodiment, the relative disturbance factor classifier (113) identifies the visual degradation in the image frame based on the monitored network parameter and the context of the electronic device (100). Further, the relative disturbance factor classifier (113) provides information on the identified visual degradation to the visual enhancement engine (115).

The visual enhancement engine (115) detects the visual quality factor of the image based on the visual degradation in the image frame. Further, the visual enhancement engine (115) modifies the visual quality factor of the image frame based on the visual degradation in the image frame for enhancing the image quality.

In an embodiment, for modifying the visual quality factor, the visual enhancement engine (115) sharpens the edges of the foreground object and/or adjusts the brightness of the image frame, and adjusts the position of pixels in the image frame that is affected by the blur motion effect. Upon modifying the visual quality factor, the frame embedding engine (116) embeds the image frame with the modified visual quality factor into the image frame received from the network (13) for generating the image frames with enhanced image quality.

In an embodiment, for sharpening the edges of the foreground object, the visual enhancement engine (115) performs the low pass filtration and high pass filtration of the foreground object. Further, the visual enhancement engine (115) determines the horizontal boundary, the vertical boundary, and the diagonal boundary of the filtered foreground object. Further, the visual enhancement engine (115) segments the image frame into the plurality of segments. Further, the visual enhancement engine (115) detects the edges of the foreground object in each segment. Further, the visual enhancement engine (115) sharpens the edges corresponding to the contrast of the background of the image frame. Further, the visual enhancement engine (115) merges the horizontal boundary, the vertical boundary, and the diagonal boundary of the foreground object with sharpened edges into the image frame.

In an embodiment, for adjusting the brightness of the image frame, the visual enhancement engine (115) identifies the optimum reference ambient light value of the electronic device (100) from the ambient light sensor (160). Further, the visual enhancement engine (115) determines the maximum and minimum channels of the image frame by applying the maximum and minimum local RGB patches on the foreground object. Further, the visual enhancement engine (115) determines the difference between the current ambient light value and the optimum reference ambient light value based on the context of the electronic device (100). Further, the visual enhancement engine (115) modifies the maximum and minimum channels based on the difference of the current ambient light value and the optimum reference ambient light value.

Although FIG. 3 shows the hardware components of the visual quality factor controller (110) but it is to be understood that other embodiments are not limited thereon. In other embodiments, the visual quality factor controller (110) may include less or more number of components. Further, the labels or names of the components are used only for illustrative purpose and does not limit the scope of the disclosure. One or more components can be combined together to perform same or substantially similar function for modifying the visual quality factor of the image frame based on the visual degradation in the image frame.

Figure 4:
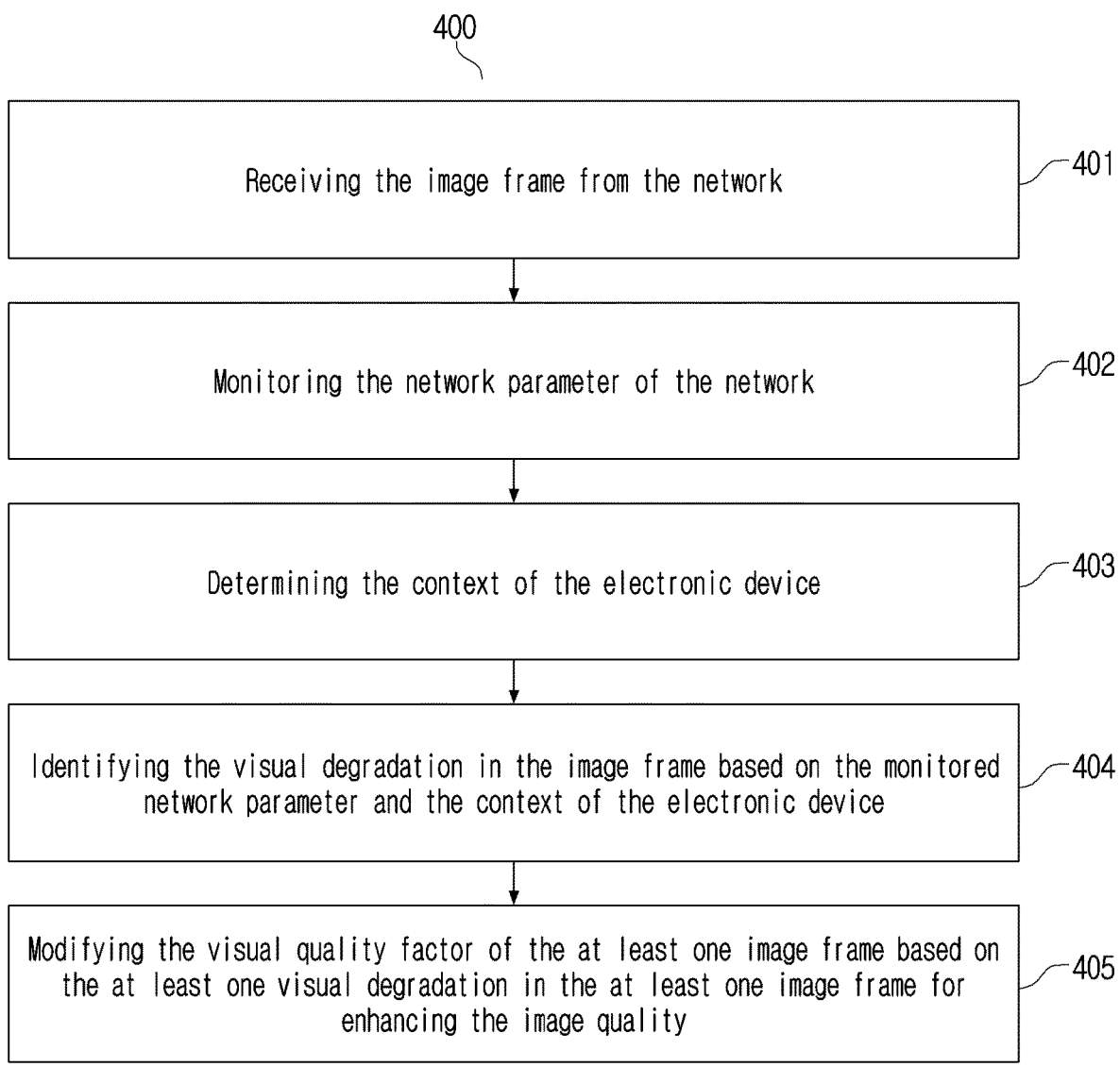
FIG. 4 is a flow diagram illustrating a method for enhancing image quality, according to an embodiment of the disclosure.

FIG. 4 is a flow diagram illustrating a method for enhancing the image quality, according to an embodiment of the disclosure.

Referring to FIG. 4, at operation 401, of flow diagram (400), the method includes receiving the image frame from a network (13). In an embodiment, the method includes the network parameter monitor (111) receiving the image frame from the network (13). At operation 402, the method includes monitoring the network parameter of the network (13). In an embodiment, the method includes the network parameter monitor (111) monitoring the network parameter of the network (13). At operation 403, the method includes determining the context of the electronic device (100). In an embodiment, the method includes the ambient property evaluator (114) determining the context of the electronic device (100).

At operation 404, the method includes identifying the visual degradation in the image frame based on the monitored network parameter and the context of the electronic device (100). In an embodiment, the method includes the relative disturbance factor classifier (113) identifying the visual degradation in the image frame based on the monitored network parameter and the context of the electronic device (100). At operation 405, the method includes modifying the visual quality factor of the image frame based on the visual degradation in the image frame for enhancing the image quality. In an embodiment, the method includes the visual enhancement engine (115) modifying the visual quality factor of the image frame based on the visual degradation in the image frame for enhancing the image quality.

The various actions, acts, blocks, steps, or the like in the flow diagram (400) may be performed in the order presented, in a different order or simultaneously. Further, in some embodiments, some of the actions, acts, blocks, steps, or the like may be omitted, added, modified, skipped, or the like without departing from the scope of the disclosure.

Figure 5:
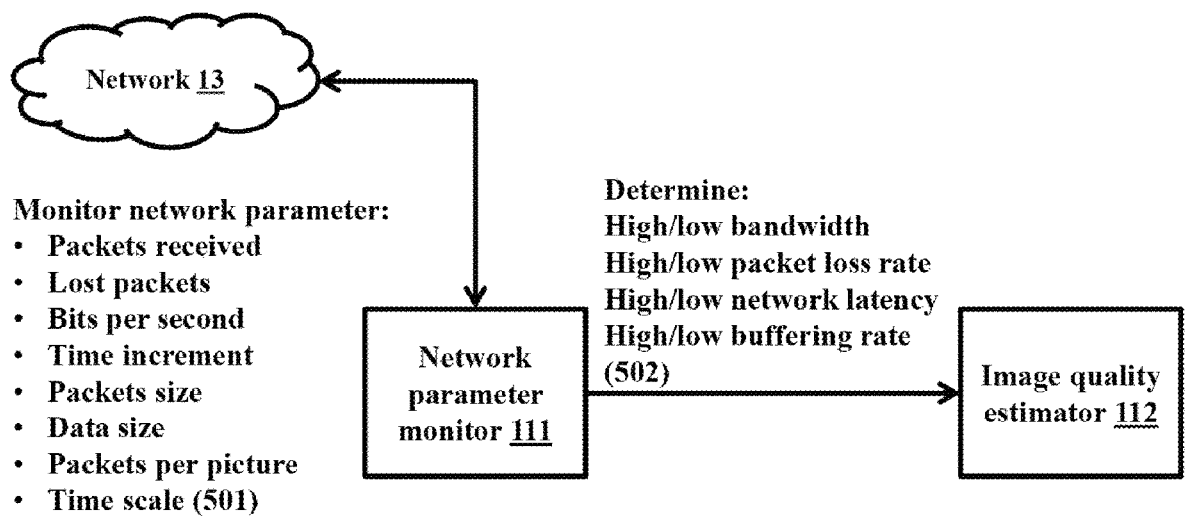
FIG. 5 is a flow diagram illustrating a method for monitoring a network parameter of a network, according to an embodiment of the disclosure.

FIG. 5 is a flow diagram illustrating a method for monitoring the network parameter of the network, according to an embodiment of the disclosure.

Referring to FIG. 5, a network parameter monitor (111) monitors, at (501), the network parameter. Further, the network parameter monitor (111) determines, at (502), whether a value of the network parameter is high or low based on the threshold value and provides the information of the high/low value of the network parameter to the image quality estimator (112). The network parameter monitor (111) determines the network bandwidth by monitoring an amount of data that is being transferred within a specific period of time (measured in bits/second). The network parameter monitor (111) determines the packet loss rate caused by an error in data transmission by monitoring ratio of packet lost against the packet sent. The network parameter monitor (111) determines the Network Latency or Delay in transmission due to the network (13) by calculating a time taken by data to travel from a sender to a receiver. The network parameter monitor (111) determines the buffering rate by pre-loading of data in a memory called a buffer.

Figure 6:
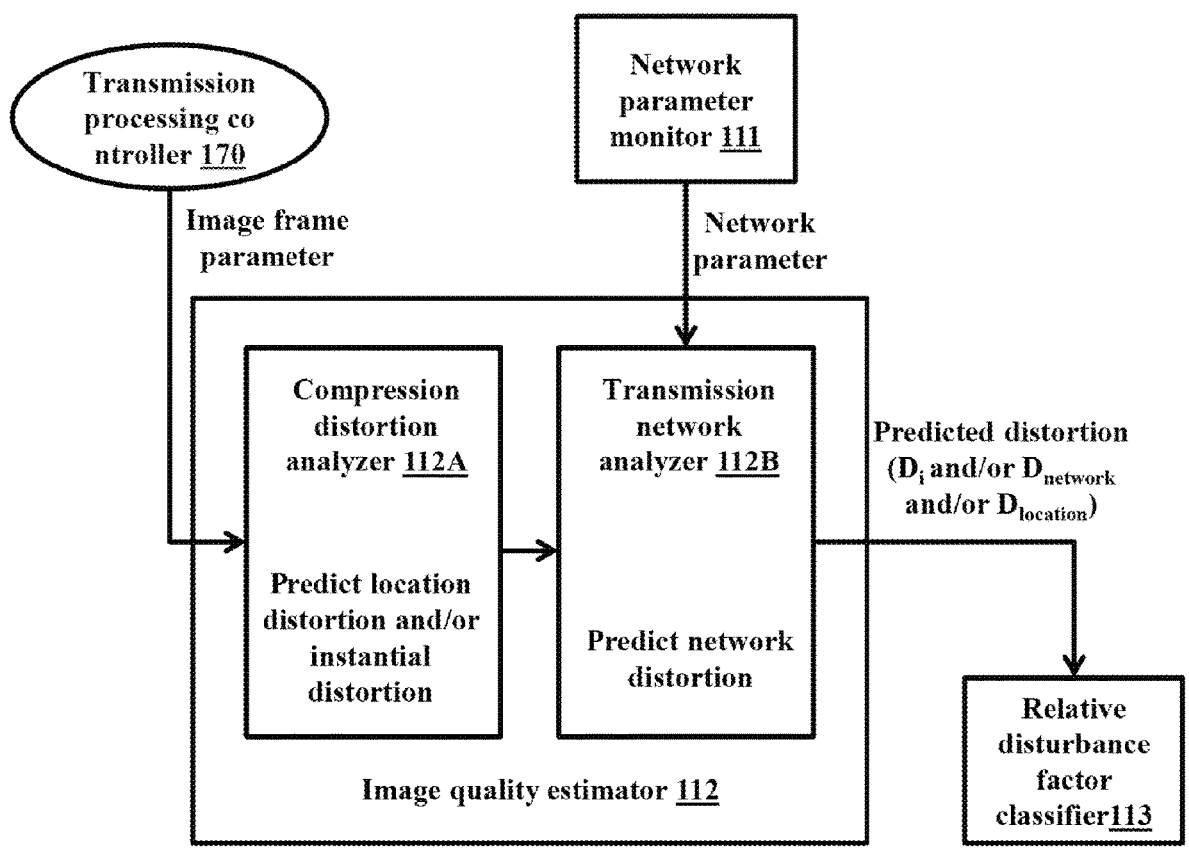
FIG. 6 is a flow diagram illustrating a method for estimating a distortion in an image frame, according to an embodiment of the disclosure.

FIG. 6 is a flow diagram illustrating a method for estimating distortion in an image frame, according to an embodiment of the disclosure.

Referring to FIG. 6, an electronic device (100) includes a transmission processing controller (170) that provides the image frame parameters to the image quality estimator (112). In an embodiment, the image quality estimator (112) includes a compression distortion analyzer (112A) and a transmission network analyzer (112B). The compression distortion analyzer (112A) receives the image frame parameters and predicts the location distortion and/or the instantial distortion in the image frame based on the image frame parameter. The transmission network analyzer (112B) receives the information of the network parameter and predicts the network distortion in the image frame based on the network parameter.

The instantial distortion ($D_i$), the location distortion ($D_{location}$), and the network distortion ($D_{Network}$) are predicted based on Equations 1, 2, and 3 respectively.

$$D_i = f(\text{Res}, \text{Net}_{Cap}) \qquad \text{Equation 1}$$

$$D_{location} = f(\text{Comp}_a, \text{Size}_{Avg\ Frame}, \text{App}_{Decoder}) \qquad \text{Equation 2}$$

$$D_{Network} = f(b_{rate}, \text{frame}_{rate}, \text{PL}_{rate}) \qquad \text{Equation 3}$$

Here, Res represents resolution of the image frame, $\text{Net}_{Cap}$ represents network carrying capabilities, $\text{Size}_{Avg\ Frame}$ represents an average frame size, $b_{rate}$ represents the bit rate, $\text{frame}_{rate}$ represents a frame rate, and $\text{PL}_{rate}$ represents the packet loss rate. The image quality estimator (112) provides information of the predicted distortion (i.e., location distortion and/or the instantial distortion and/or network distortion) to the relative disturbance factor classifier (113).

The image quality estimator (112) uses the bit rate, the frame rate of the received image frames along with the packet loss rate to predict the possible network distortions in the upcoming image frame of the video for identifying, transmission errors and compression faults. The quality of the image stream is a characteristic of a video signal passed through a transmission processing system. The image quality estimator (112) represents a measure of perceived degradation in any image frame with respect to an original source image. Video processing system may be a network/server that usually introduce some distortions in the receiving image signal, but the amount of distortions involved may differ depending on various network parameters or the content being processed. The image quality estimator (112) formulates to analyze the various parameters of the network (13) and various protocols of transmission that have the tendency to add distortions to the frames of an ongoing video stream e.g., video call.

The image quality estimator (112) applies the analysis of these network parameters and has the uniqueness to predict the distortions in the image/frame even without the frame being received by the image quality estimator (112). Thus, the image quality estimator (112) helps in pre-initializing required resources for enhancement of the image quality and helps to fasten the electronic device (100) for real time frame enhancement, and prevents lag in the video stream. Moreover, the electronic device (100) does not consume any memory storage of the memory (120) for storing the previous frames.

Figure 7A:
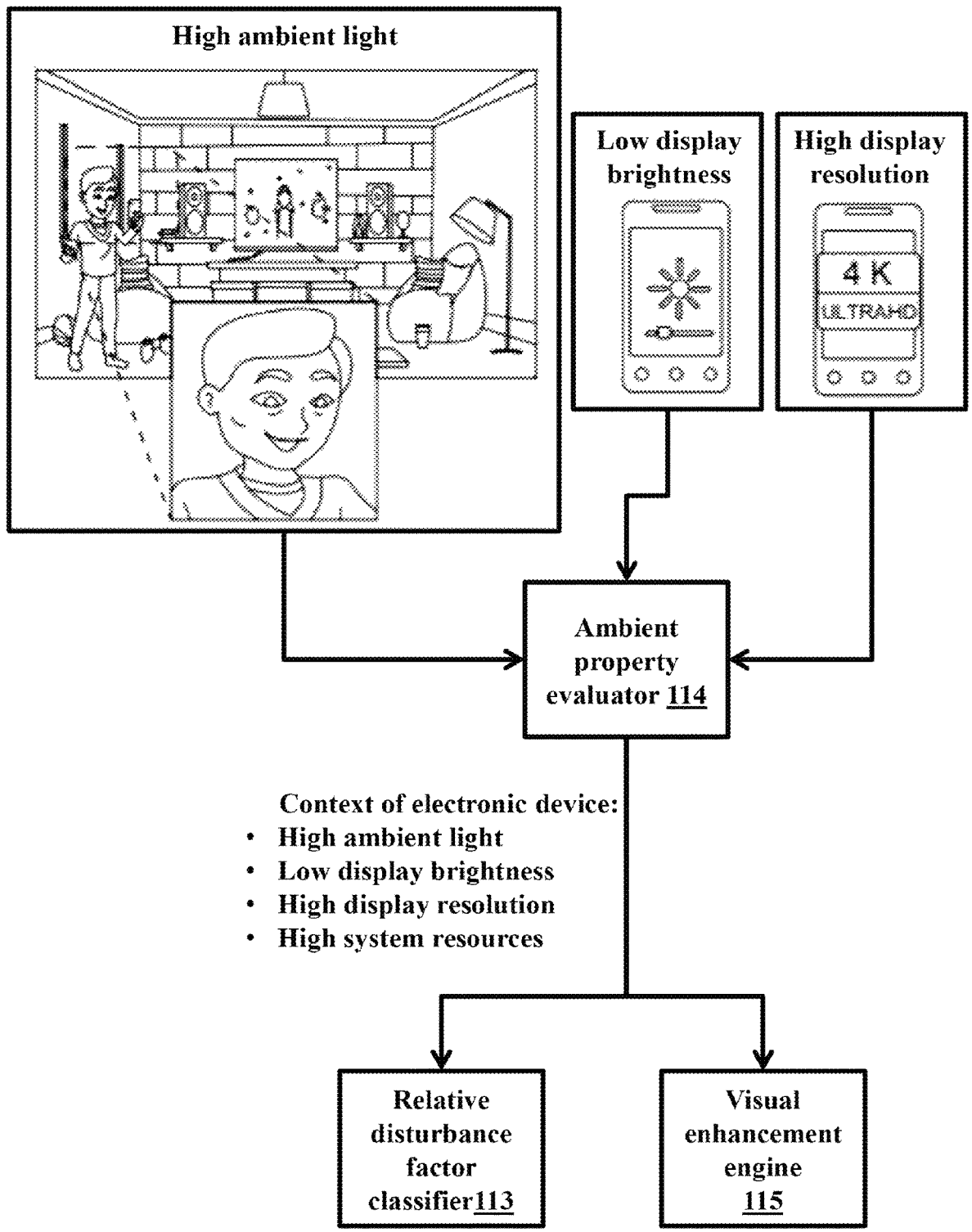
FIGS. 7A and 7B illustrates example scenarios of determining a context of an electronic device, according to various embodiments of the disclosure.
Figure 7B:
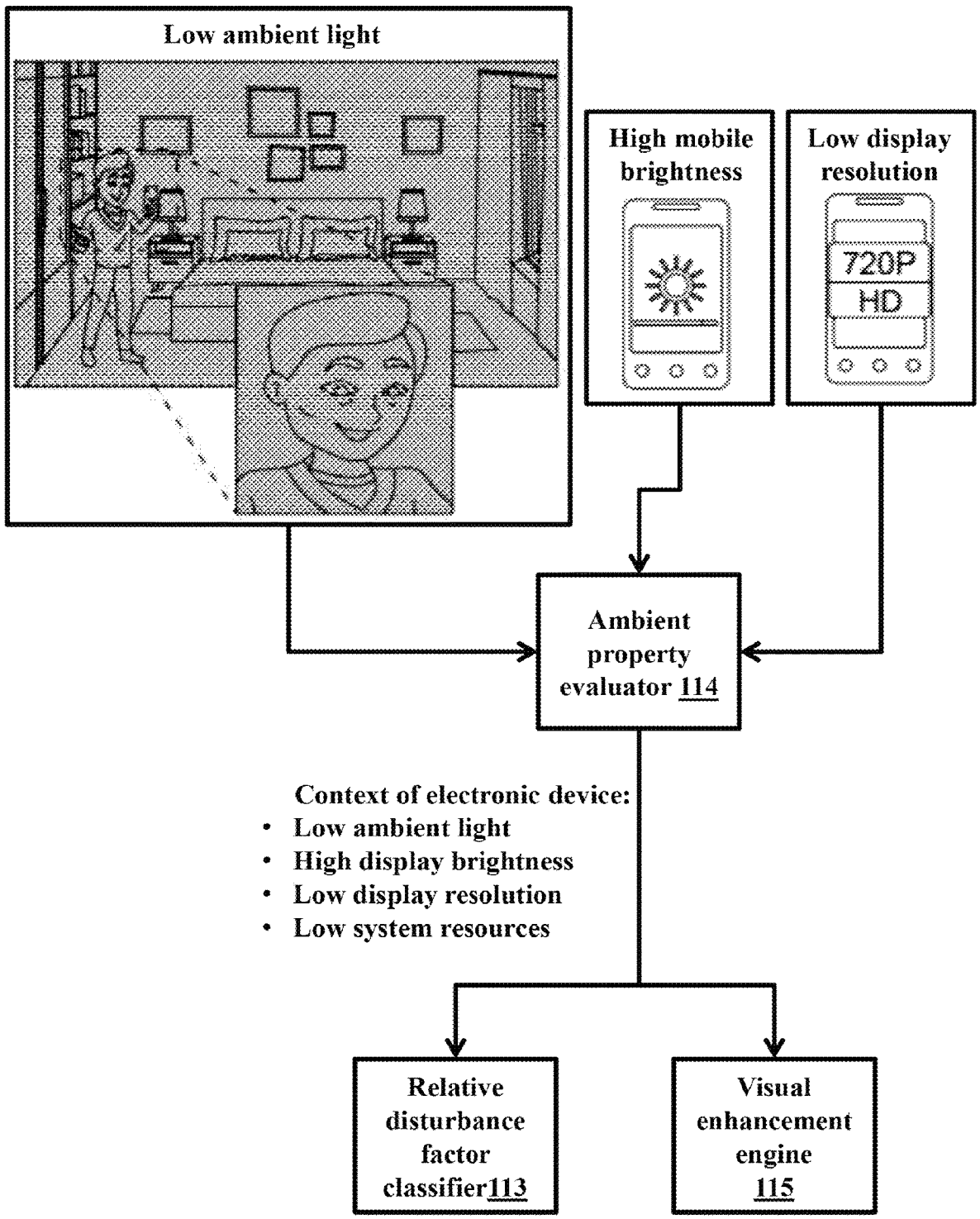

FIGS. 7A and 7B illustrates example scenarios of determining the context of the electronic device, according to various embodiments of the disclosure.

Referring FIG. 7A, consider the ambient light around an electronic device (100) is high, the display resolution is high, and the resource availability of the electronic device (100) is also high. The electronic device (100) detects the high ambient light using the ambient light sensor (160) and lowers the display brightness. Upon determining the context of the electronic device (100) as the high ambient light, the low display brightness, the high display resolution, and the high system resources, the ambient property evaluator (114) provides the context of the electronic device (100) to the relative disturbance factor classifier (113), and the visual enhancement engine (115).

Referring to FIG. 7B, consider the ambient light around an electronic device (100) is low, the display resolution is low, and the resource availability of the electronic device (100) is also low. The electronic device (100) detects the low ambient light using the ambient light sensor (160) and increases the display brightness. Upon determining the context of the electronic device (100) as the low ambient light, the high display brightness, low display resolution, and the low system resources, the ambient property evaluator (114) provides the context of the electronic device (100) to the relative disturbance factor classifier (113), and the visual enhancement engine (115).

Figure 8:
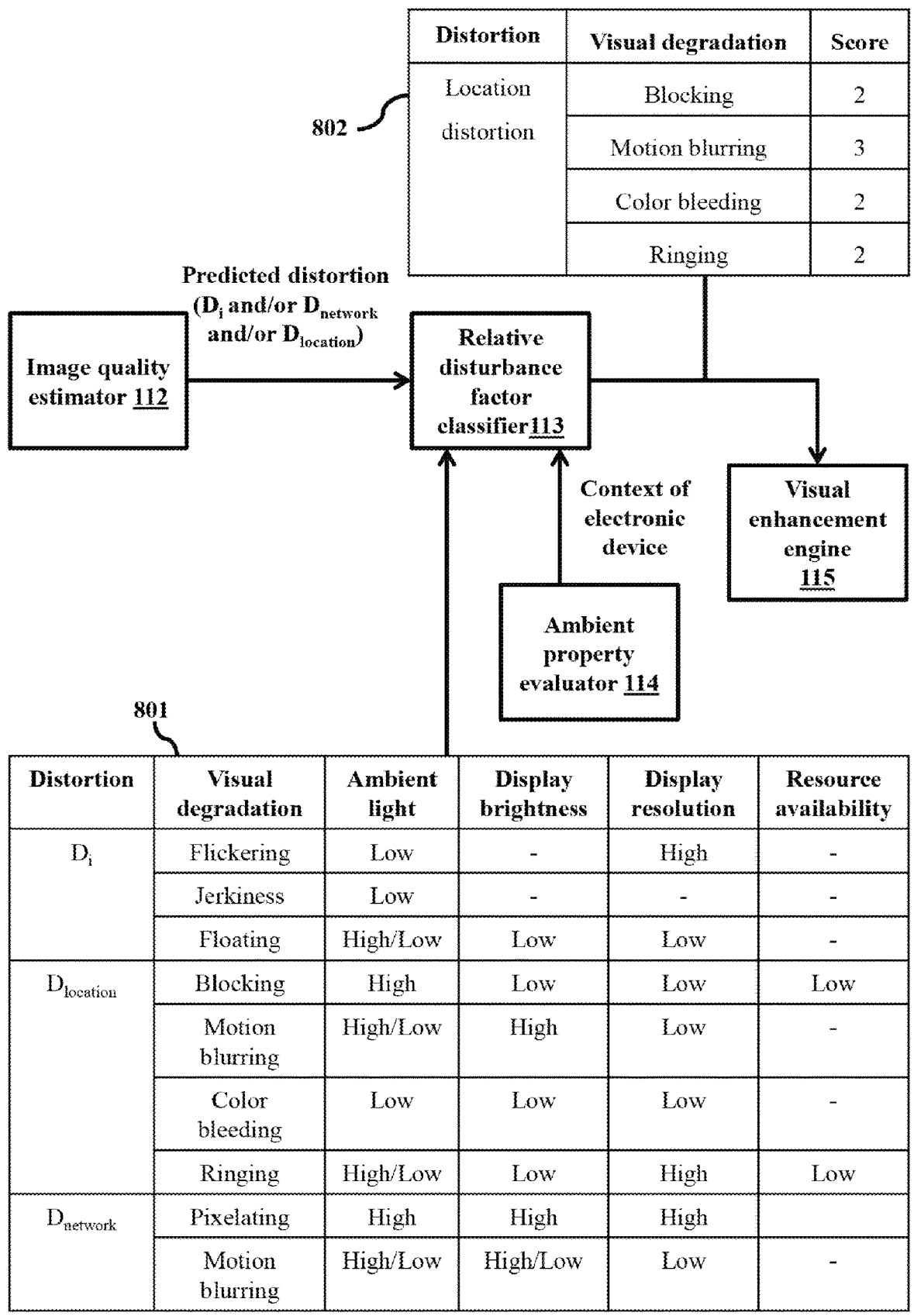
FIG. 8 is a flow diagram illustrating a method for determining a visual degradation in an image frame, according to an embodiment of the disclosure.

FIG. 8 is a flow diagram illustrating a method for determining a visual degradation in an image frame, according to an embodiment of the disclosure.

Referring to FIG. 8, a relative disturbance factor classifier (113) receives the information of the predicted distortion from an image quality estimator (112), and the context of an electronic device (100) from an ambient property evaluator (114). Further, the relative disturbance factor classifier (113) fetches a mapping table (801) from the memory (120). The mapping table (801) includes a list of distortions and a list of visual degradations under each distortion and a predefined context related to each visual degradation. The predefined context includes predefined level (e.g. low or high) of the ambient light, the display brightness, the display resolution, and the resource availability. An example of the mapping table (801) is given in Table 1.

TABLE 1

| Distortion | Visual degradation | Ambient light | Display brightness | Display resolution | Resource availability |
|---|---|---|---|---|---|
| $D_i$ | Flickering | Low | — | High | — |
| | Jerkiness | Low | — | — | — |
| | Floating | High/Low | Low | Low | — |
| $D_{location}$ | Blocking | High | Low | Low | Low |
| | Motion blurring | High/Low | High | Low | — |
| | Colour bleeding | Low | Low | Low | — |
| | Ringing | High/Low | Low | High | Low |
| $D_{network}$ | Pixelating | High | High | High | — |
| | Motion blurring | High/Low | High/Low | Low | — |

The relative disturbance factor classifier (113) selects the visual degradations listed under the predicted distortion from the visual degradations. Further, the relative disturbance factor classifier (113) matches the context of the electronic device (100) with the predefined context of each selected visual degradation listed under the predicted distortion. Further, the relative disturbance factor classifier (113) gives one point/mark for a successful match. Further, the relative disturbance factor classifier (113) determines the score of each selected visual degradation by summing the points/marks received to the selected visual degradation for the successful match. Further, the relative disturbance factor classifier (113) selects a first 'n' number of visual degradations with higher scores, where n is a positive integer that is less than or equal to a number of selected visual degradations. In an embodiment, when the scores for visual degradations are same that are under consideration for selection, then the relative disturbance factor classifier (113) selects all those visual degradations for further operations. Further, the relative disturbance factor classifier (113) provides information of the selected first 'n' number of visual degradations to the visual enhancement engine (115).

Consider an example scenario in which the context of the electronic device (100) includes low ambient light, high display brightness, low display resolution, and low resource availability, and the predicted distortion is the location distortion. Upon determining that the predicted distortion is the location distortion, the relative disturbance factor classifier (113) selects the visual degradations under the location distortion, i.e., the blocking, the motion blurring, the color bleeding, and the ringing. The predefined context of the blocking are high ambient light, low display brightness, low display resolution, and low resource availability. The relative disturbance factor classifier (113) matches the context of the electronic device (100) with the predefined context of the blocking and gives one point for a successful matching of the low display resolution and one point for a successful matching of the low resource availability. The predefined context of the motion blurring is high/low ambient light, high display brightness, and low display resolution.

The relative disturbance factor classifier (113) matches the context of the electronic device (100) with the predefined context of the motion blurring and gives one point for successful matching of the low ambient light, one point for successful matching of the high display brightness, and one point for successful matching of the low display resolution. The resource availability has no significance in the predefined context of the motion blurring, and hence no score is given for the low resource availability by the predefined context of the motion blurring. Similarly, the relative disturbance factor classifier (113) determines the points for the color bleeding and the ringing. Further, the relative disturbance factor classifier (113) determines the score for each visual degradation listed under the location distortion by adding the points received for that location distortion. For example, the score of the blocking=1+1=2. The score of the motion blurring=1+1+1=3. An example of the score determined of each selected visual degradation is shown in (802) and given in Table 2.

TABLE 2

| Distortion | Visual degradation | Score |
|---|---|---|
| Location distortion | Blocking | 2 |
| | Motion blurring | 3 |
| | Color bleeding | 2 |
| | Ringing | 2 |

Each type of visual degradation is called a Relative Disturbance factor (RDF). The RDF indicates a particular distortion to which the RDF belongs hampers the user experience for various types of local conditions (i.e., context) at the user's end. For low ambient light at the electronic device (100), the visual degradation "flickering" is a disturbing factor that makes the RDF of flickering increase by 1 if the ambient light in the surroundings is low. Thus, the relative disturbance factor classifier (113) intelligently prevents unnecessary wastage of the resources by enhancing only those relative disturbance factor classifiers (113) which are most disturbing to the user in a current scenario. The visual degradation and the score in Table 2 is called an RDFWtMap that is determined using the operations given below.

RDFWtMap=F_Create_RDFWtMap (RDFMat [ ][ ], list$_{Dist}$):
for i: 1 to len$_{RDFlist}$
if DistortionType(RDF$_i$) is in list$_{Dist}$:
for j: 1 to len$_{DP}$
if RDFMat[i][j] contains list$_{DP}$[j]: RDF$_{val}$++
Add (RDF$_i$: RDF$_{val}$) to RDFWtMap Here, list$_{Dist}$ represents the list of input visual degradation, RDFMat represents RDF display property relation, RDFWtMap represents RDF significance weight map, len$_{RDFlist}$ represents number of RDF items, len$_{DP}$ represents number of display properties, and list$_{DP}$ represents a list of current display property at the electronic device (100).

Figure 9:
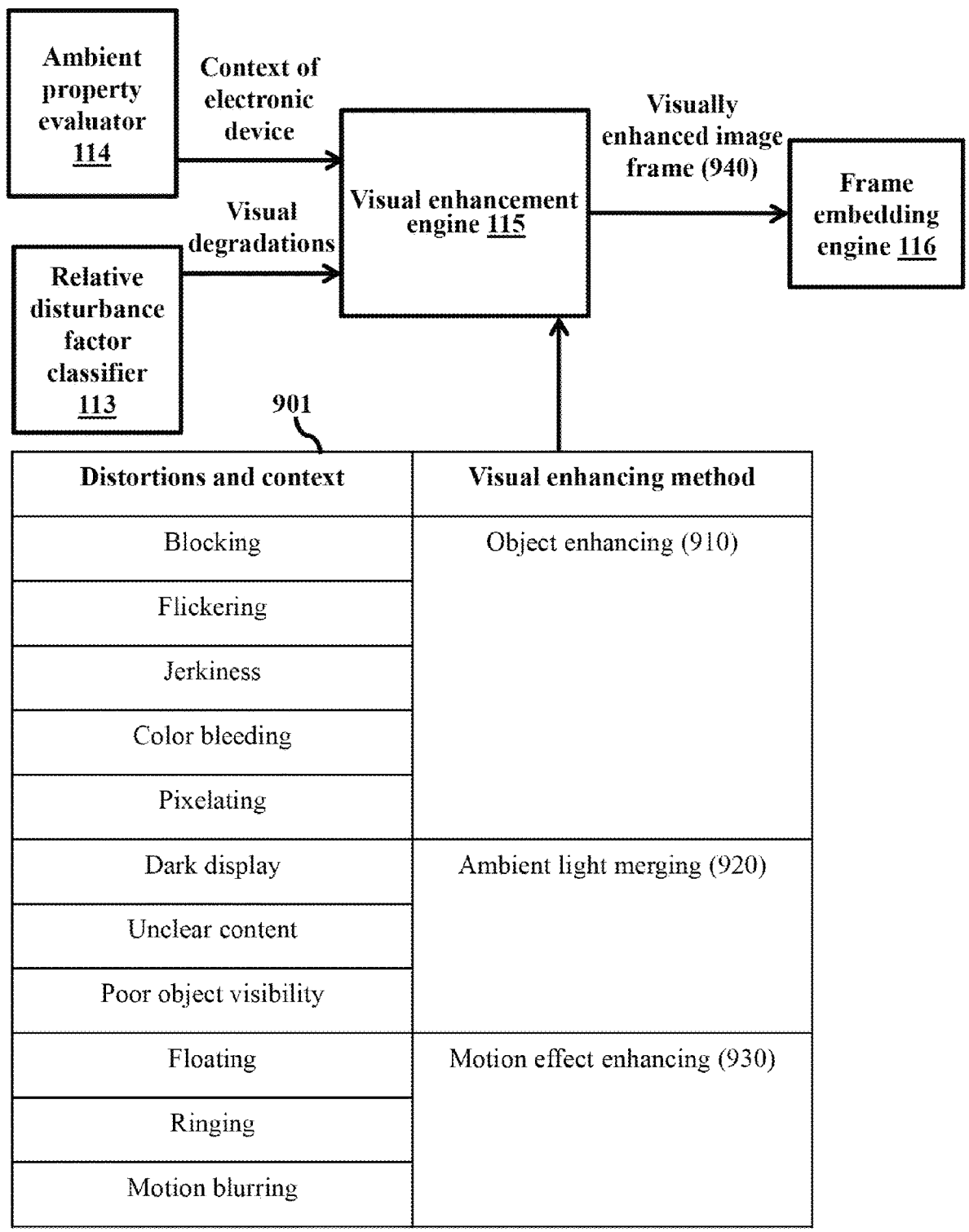
FIG. 9 is a flow diagram illustrating a method for enhancing image quality based on visual degradation in an image frame, according to an embodiment of the disclosure.

FIG. 9 is a flow diagram illustrating a method for enhancing image quality based on a visual degradation in an image frame, according to an embodiment of the disclosure.

Referring to FIG. 9, a visual enhancement engine (115) receives the information of the selected first 'n' number of visual degradations from a relative disturbance factor classifier (113), and the context of an electronic device (100) from an ambient property evaluator (114). Further, the visual enhancement engine (115) determines a visual enhancing method to perform on the image frame based on the visual degradations and the context of the electronic device (100) as shown in (901). The visual enhancing method can be object enhancing (910), ambient light merging (920), and motion effect enhancing (930). The visual enhancement engine (115) examines visual properties of the foreground object in each image frame and applies an intelligent method on a selected portion of the image frame to enhance the visual properties for preventing the display problem of the foreground object in that image frame.

The purpose of performing the object enhancing is to differentiate and clearly show the foreground object in the image frame. The purpose of performing the ambient light merging is to provide a proper visibility of the image frame according to the ambient light around the ambient light merging. The purpose of performing the motion effect enhancing is to minimize a blur motion effect in the image frame. If the distortions and/or the context are at least one of the blocking, the flickering, the jerkiness, the color bleeding, and then pixelating, then the visual enhancement engine (115) performs the object enhancing. If the distortions and/or the context are at least one of dark display, unclear content, and poor object visibility, then the visual enhancement engine (115) performs the ambient light merging. If the distortions and/or the context are at least one of the floating, the ringing, and the motion blurring, then the visual enhancement engine (115) performs the motion effect enhancing. Upon visually enhancing the image frame, the visual enhancement engine (115) sends the visually enhanced image frame (i.e., the image frame with the modified visual quality factor) (940) to the frame embedding engine (116).

Figure 10:
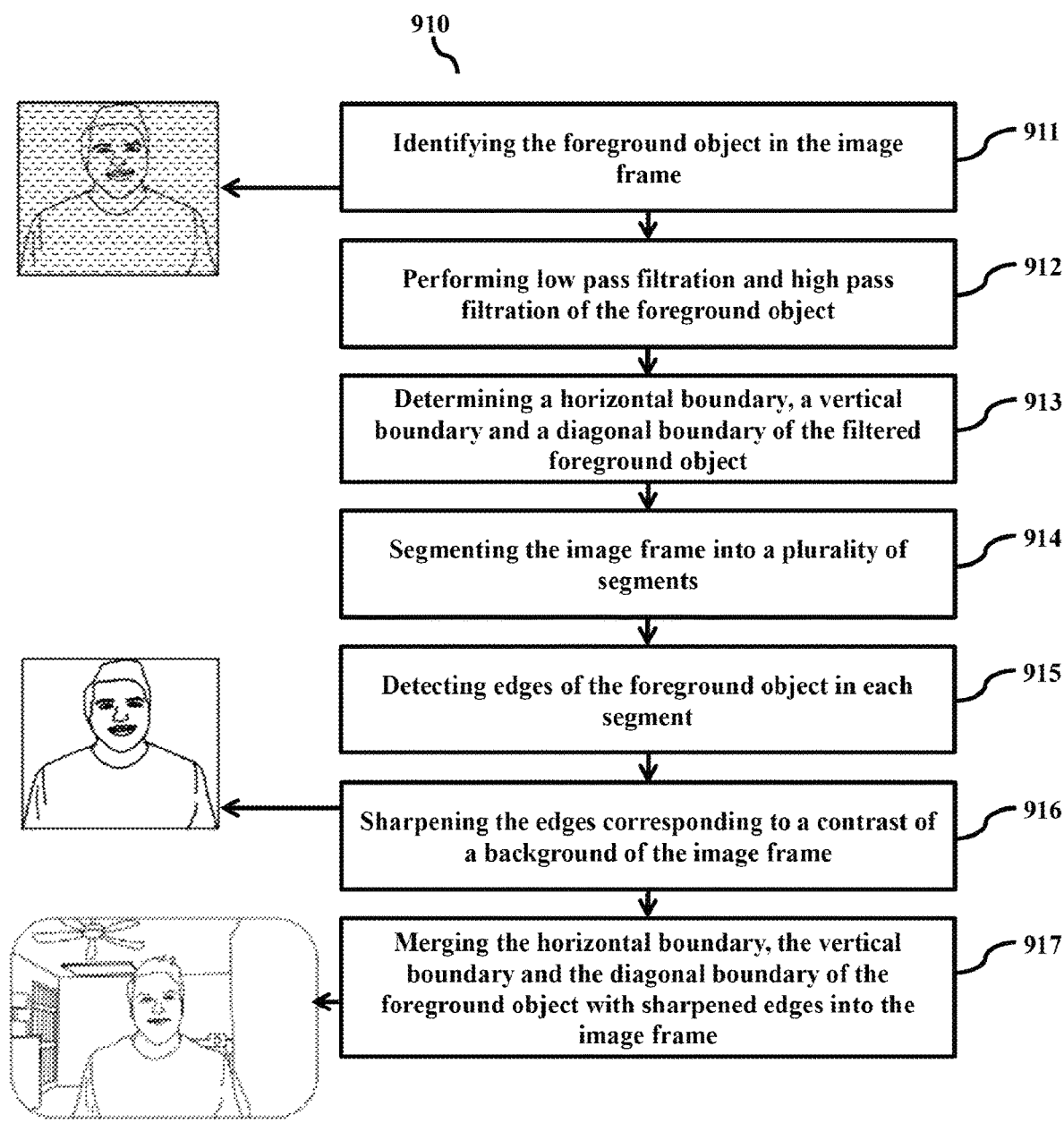
FIG. 10 is a flow diagram illustrating a method for enhancing a foreground object of an image frame, according to an embodiment of the disclosure.

FIG. 10 is a flow diagram illustrating a method for enhancing a foreground object of an image frame, according to an embodiment of the disclosure.

Referring to FIG. 10, a visual enhancement engine (115) performs operations 911-917 of flow diagram for object enhancing (910) the foreground object of the image frame. At operation 911, the method includes identifying the foreground object in the image frame. At operation 912, the method includes performing the low pass filtration and the high pass filtration of the foreground object. At operation 913, the method includes determining the horizontal boundary, the vertical boundary and the diagonal boundary of the filtered foreground object.

At operation 914, the method includes segmenting the image frame into the plurality of segments. At operation 915, the method includes detecting the edges of the foreground object in each segment. At operation 916, the method includes sharpening the edges corresponding to the contrast of the background of the image frame. At operation 917, the method includes merging the horizontal boundary, the vertical boundary and the diagonal boundary of the foreground object with sharpened edges into the image frame. The visual enhancement engine (115) has the capability to sharpen the image as per focus of the receiving side. Since the visual enhancement engine (115) focuses on sharpening the object boundaries inside the image frame, distortions such as blocking, flickering, jerkiness, pixelating, color bleeding are being enhanced using the visual enhancement engine (115).

Figure 11:
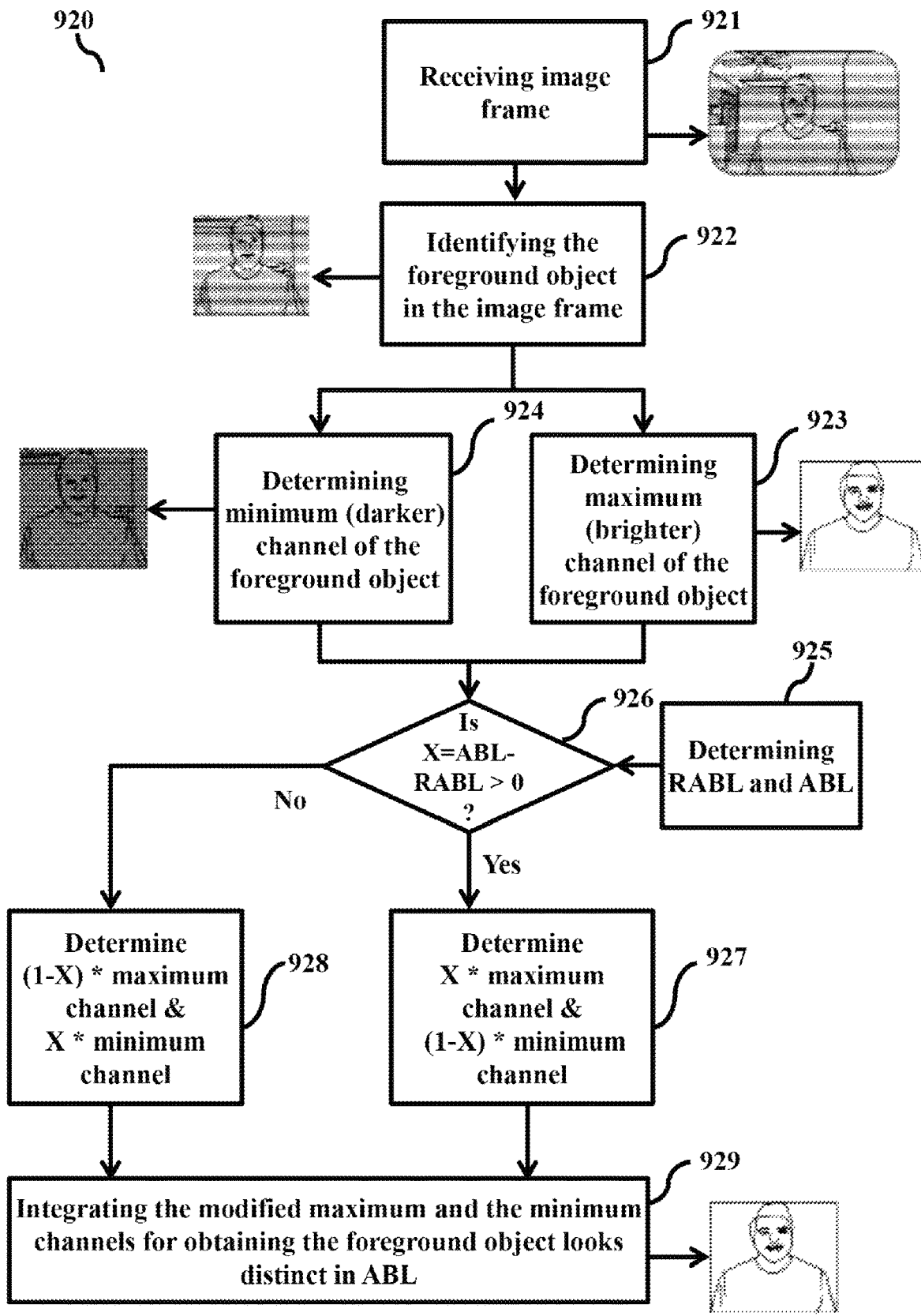
FIG. 11 is a flow diagram illustrating a method for ambient light merging of an image frame, according to an embodiment of the disclosure.

FIG. 11 is a flow diagram illustrating a method for ambient light merging of an image frame, according to an embodiment of the disclosure.

Referring to FIG. 11, a visual enhancement engine (115) performs operations 921 to 929 of flow diagram for ambient light merging (920) of the image frame. At operation 921, the method includes receiving the image frame. At operation 922, the method includes identifying the foreground object in the image frame. At operation 923, the method includes determining the maximum (brighter) channel of the foreground object. At operation 924, the method includes determining the minimum (darker) channel of the foreground object. At operation 925, the method includes determining the Optimum Reference Ambient Light Value (RABL) from the ambient light sensor (160) and the Current Ambient Light Value (ABL) from the context of the electronic device (100). Further, the method includes determining X=ABL−RABL. At operation 926, the method includes checking whether X is greater than 0. At operation 927, the method includes determining a product of X and maximum channel, and a product of (1−X) and minimum channel, when X is greater than 0. At operation 928, the method includes determining the product of (1−X) and maximum channel, and the product of X and minimum channel, when X is not greater than 0. At operation 929, the method includes integrating the modified maximum and the minimum channels for obtaining the foreground object that looks distinct in the current ambient light value.

The visual enhancement engine (115) has the capability to improve brightness/lighting factor of the image frame and makes the image frame adaptive as per the ambient light, the display brightness and a contrast of the electronic device (100). Since the visual enhancement engine (115) focuses on light related distortions inside the image frame, the distortions such as dark screen, poor object visibility, and unclear content are being enhanced using the visual enhancement engine (115).

Figure 12:
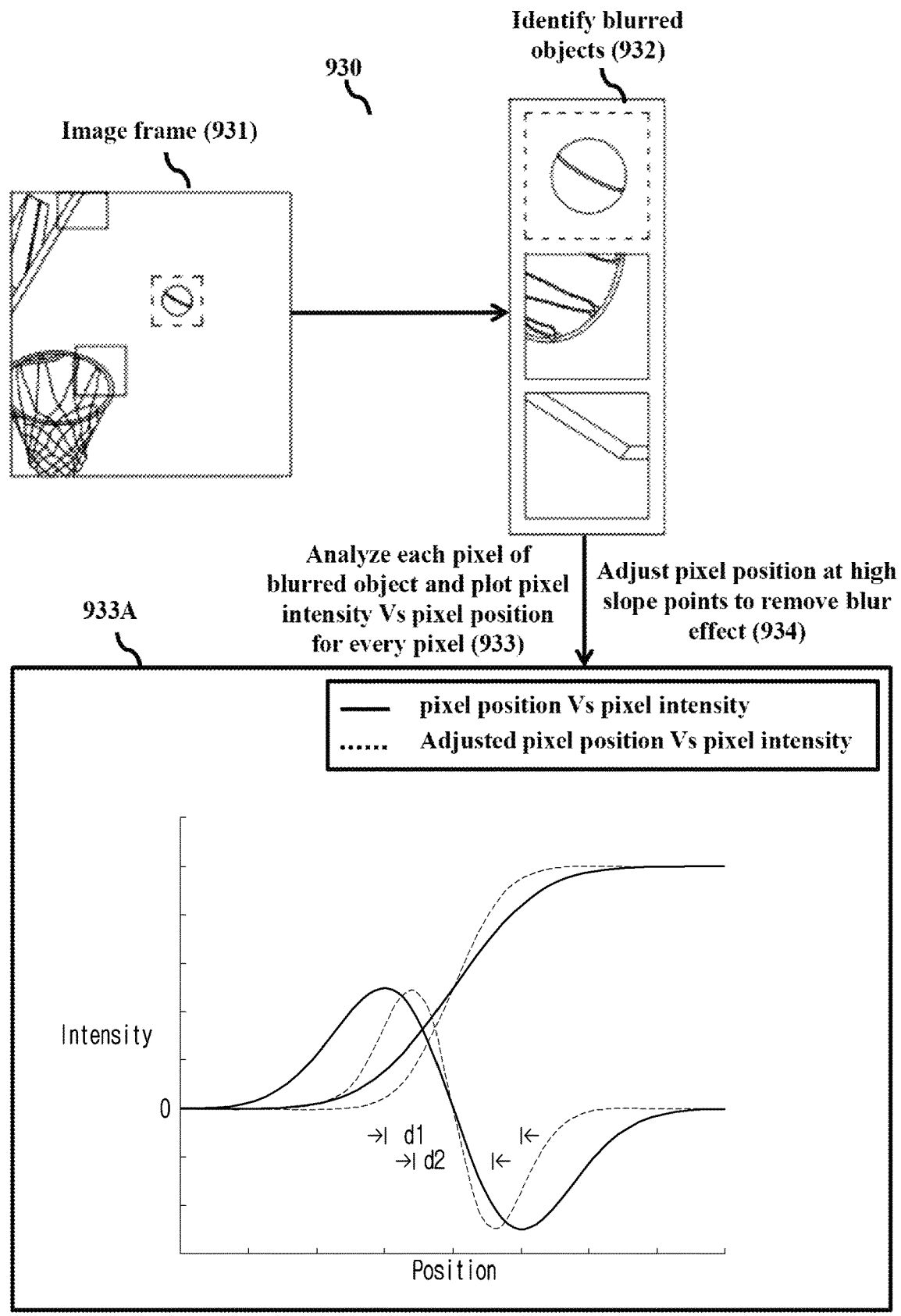
FIG. 12 is a flow diagram illustrating a method for deblurring an image frame, according to an embodiment of the disclosure.

FIG. 12 is a flow diagram illustrating a method for deblurring of the image frame, according to an embodiment of the disclosure.

Referring to FIG. 12, a visual enhancement engine (115) performs operations 931 to 935 of the flow diagram for motion effect enhancing (930) for deblurring of the image frame. At operation 931, the method includes receiving the image frame includes the blurred objects. At operation 932, the method includes identifying the blurred objects in the image frame. At operation 933, the method includes analyzing each pixel of the blurred object and plotting pixel intensity against pixel position for every pixel in a graph (933A). At operation 934, the method includes adjusting the pixel position at high slope points in the graph to remove the blur effect in the image frame.

Figure 13:
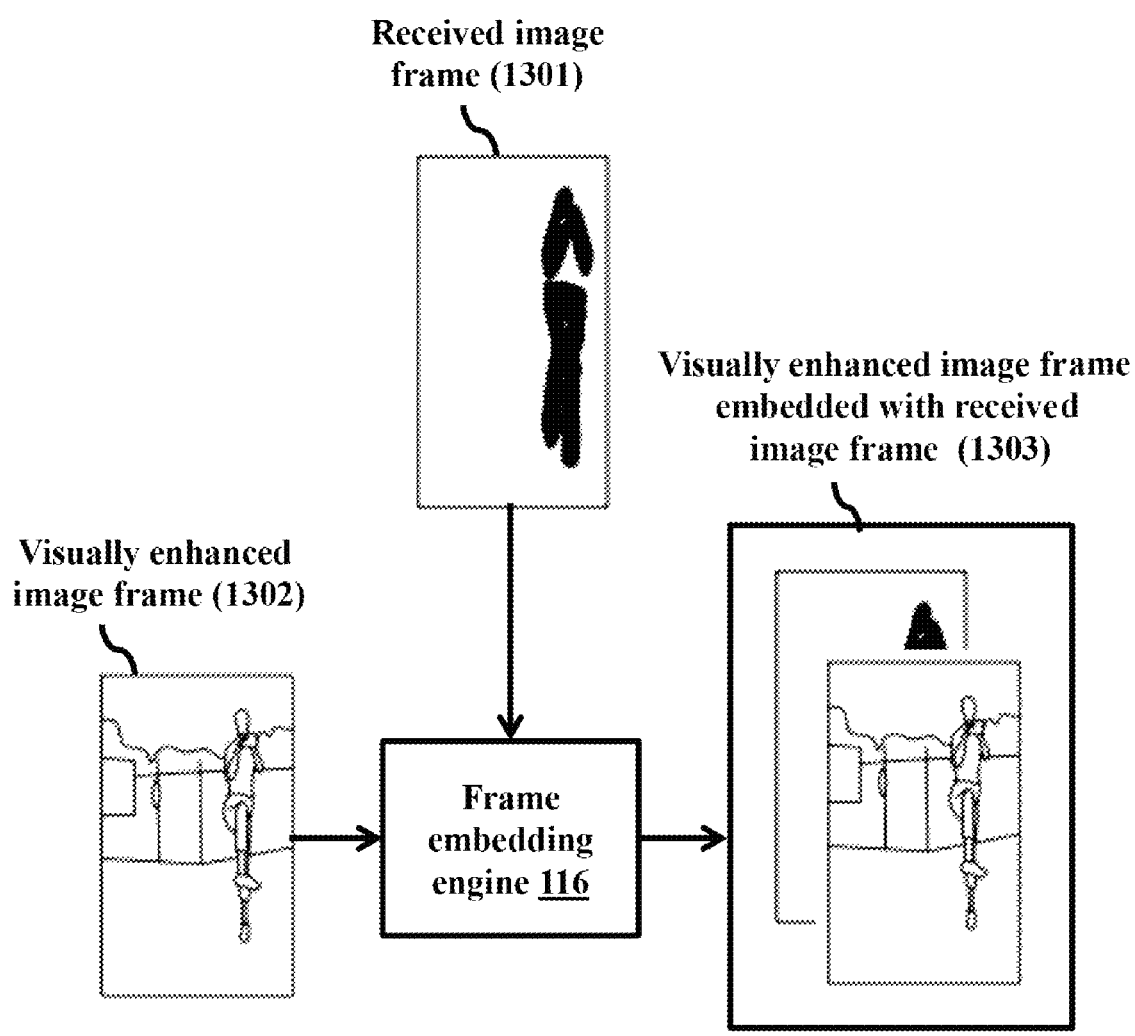
FIG. 13 is a flow diagram illustrating a method for embedding an enhanced image frame with a video, according to an embodiment of the disclosure.

FIG. 13 is a flow diagram illustrating a method for embedding the enhanced image frame with the video, according to an embodiment of the disclosure.

Referring to FIG. 13, upon receiving a visually enhanced image frame (1302) from the visual enhancement engine (115), the frame embedding engine (116) embeds the visually enhanced image frame (1302) with an image frame (1301) received from the network (13) to obtain a visually enhanced image frame embedded with the received image frame (1303), where the image frame (1301) received from the network (13) contains the distortions. The frame embedding engine (116) adds the enhanced image frame to the main stream of the image frames that helps in maintaining a continuity for frames in the real time and prevent video lag due to enhancement.

Figure 14:
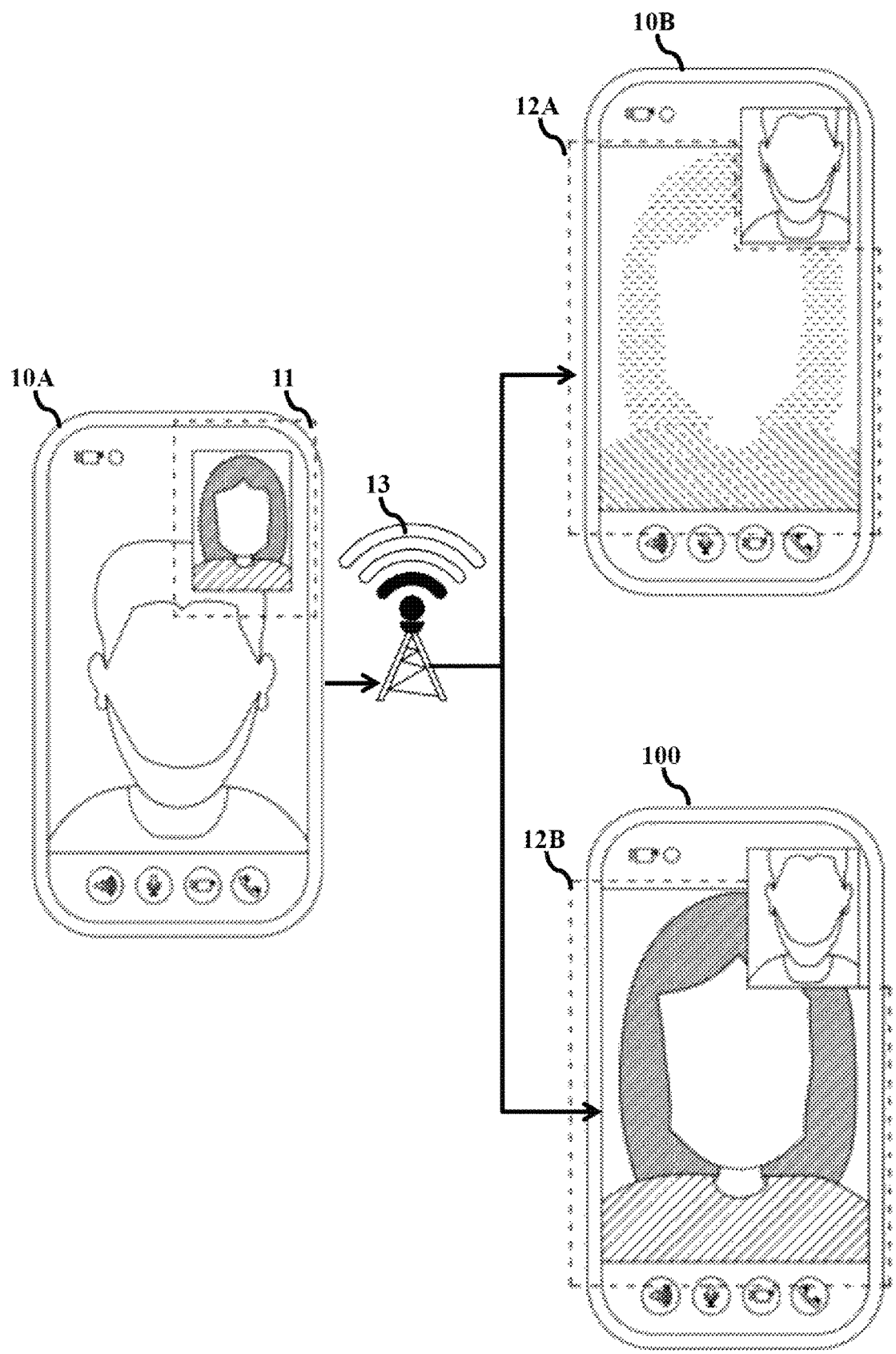
FIG. 14 illustrates a comparison of a video call established through a low quality network by an electronic device and a proposed electronic device, according to an embodiment of the disclosure.

FIG. 14 illustrates a comparison of the video call established through the low quality network by an electronic device and a proposed electronic device, according to an embodiment of the disclosure.

Referring to FIG. 14, a user calls a friend using an electronic device (10B) and a proposed electronic device (100) via a network (13) with a weak wireless signal. The electronic device (10B) and the proposed electronic device (100) receive the video (11) of the friend from the network (13). The electronic device (10B) displays a pixilated image of the friend with low quality due to the weak wireless signal of the network (13). Unlike electronic device (10B), the proposed electronic device (100) ensures that the image of the friend in a video (12B) received from the network (13) is not pixilated and enhances the image quality using the proposed method while displaying the image of the friend in the video (12B) to the user even at the weak wireless signal of the network (13), which improves a user experience.

Figure 15:
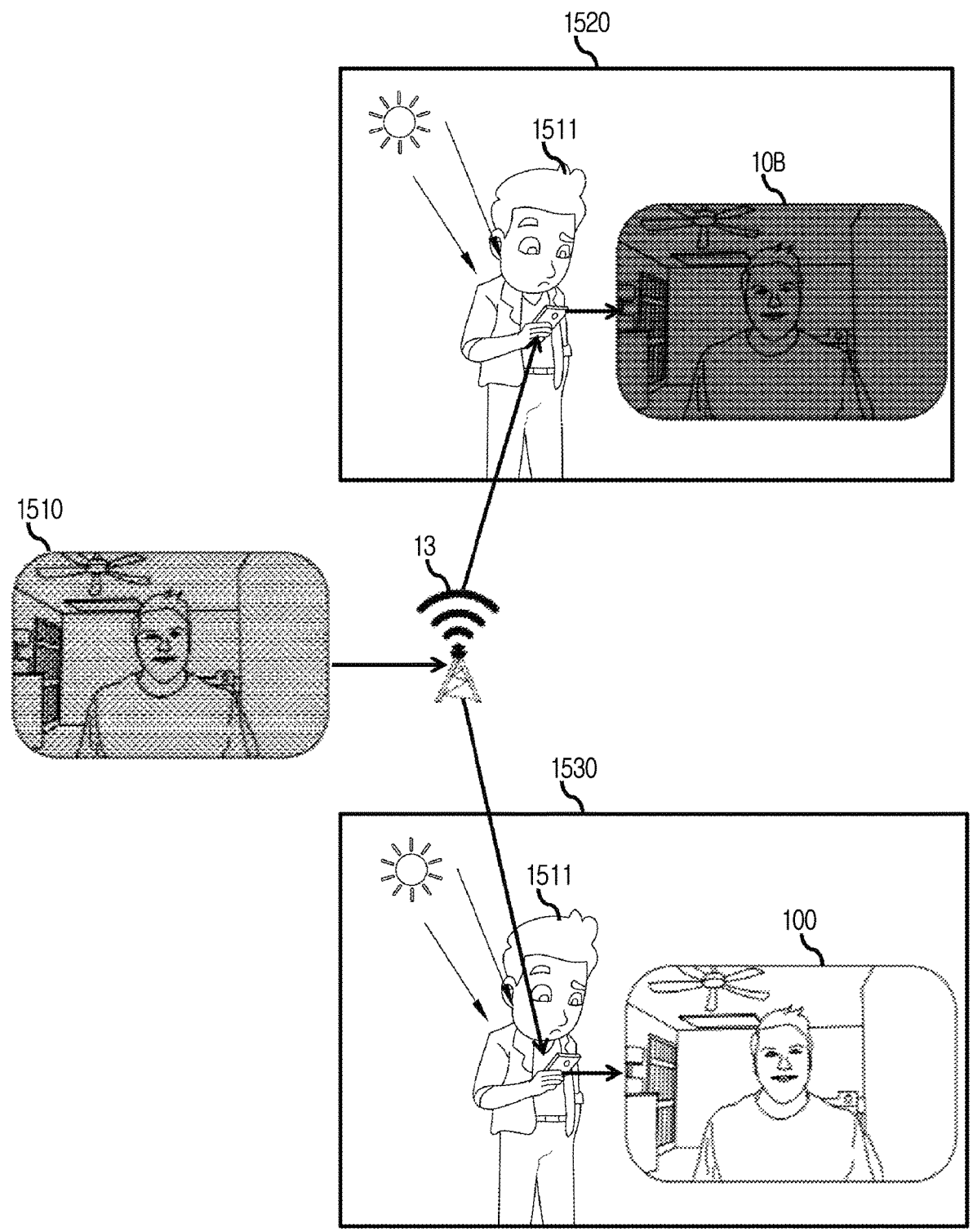
FIG. 15 illustrates a comparison of a video of an object recorded at low ambient light that is displayed by an electronic device and a proposed electronic device, according to an embodiment of the disclosure.

FIG. 15 illustrates a comparison of a video of an object recorded at low ambient light that is displayed by an electronic device and a proposed electronic device, according to an embodiment of the disclosure.

Referring to FIG. 15, both electronic device (10B) and proposed electronic device (100) receive a video (1510) of an object via the network (13) with a strong wireless signal. The video (1510) of the object is recorded at the low ambient light, and hence the video (1510) is darker to view. A user (1511) is watching the video (1510) using the electronic device (10B) and the proposed electronic device (100) by standing in an open space during daytime, and hence the ambient light around the user (1511) is high.

Due to the strong wireless signal of the network (13), both the electronic device (10B) and the proposed electronic device (100) display the video (1510) at high quality. As shown in (1520), even though the electronic device (10B) displays the video (1510) at high quality, the user (1511) feels like the received video (1510) is darker at the electronic device (10B) due to the high ambient light around the user (1511) and unfavorable mobile brightness, which degrades visibility of the video (1510) for the user (1511). As shown in 1530, unlike electronic device (10B), the proposed electronic device (100) modifies the brightness and/or the contrast of the video (1510) using the proposed method while displaying the video (1510) to the user (1511), which improves the visibility of the video (1510) for the user (1511).

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an electronic device for enhancing image quality, the method comprising:
   receiving, by the electronic device, at least one image frame from a network;
   based on the receiving of the at least one image frame from the network, monitoring, by the electronic device, a network parameter and determining, by the electronic device, a context of the electronic device, the determining of the context including determining, by the electronic device, a level of ambient light around the electronic device, a level of brightness of a display of the electronic device, a level of display resolution, and a level of system resources;
   determining, by the electronic device, a level of a value of the monitored network parameter based on a threshold value;
   based on the level of the value of the monitored network parameter and the determined context of the electronic device including the determined level of ambient light around the electronic device, the determined level of brightness of the display, the determined level of display resolution, and the determined level of system resources, identifying, by the electronic device, at least one visual degradation in the at least one image frame; and
   based on the at least one visual degradation in the at least one image frame, modifying, by the electronic device, a visual quality factor of the at least one image frame, wherein the modifying of the visual quality factor comprises:
      based on the at least one visual degradation, detecting, by the electronic device, the visual quality factor, the visual quality factor comprising edges of a foreground object, a brightness level, and a blur motion effect of the at least one image frame,
      sharpening, by the electronic device, the edges of the foreground object, the edges corresponding to a contrast of a background of the at least one image frame,
      adjusting, by the electronic device, the brightness level of the at least one image frame based on an optimum reference ambient light value, and
      adjusting, by the electronic device, position of pixels in the at least one image frame affected by the blur motion effect.

2. The method of claim 1, wherein the network parameter comprises at least one of a bit rate, a frame rate, a packet loss rate, a bandwidth, a buffering rate, or a latency.

3. The method of claim 1, wherein the at least one visual degradation comprises flickering, jerkiness, floating, blocking, motion blurring, color bleeding, ringing, or pixelating.

4. The method of claim 1, wherein the identifying of the at least one visual degradation in the at least one image frame comprises:
   monitoring, by the electronic device, an image frame parameter of the at least one image frame, the image frame parameter comprising at least one of an image compression of the at least one image frame, an average size of the at least one image frame, a resolution of the at least one image frame, network carrying capabilities, or an application of the electronic device used for receiving the at least one image frame;

based on the network parameter and the image frame parameter, estimating, by the electronic device, at least one distortion in the at least one image frame, the at least one distortion comprising an instantial distortion, a location distortion, or a network distortion;

mapping, by the electronic device, the at least one distortion to a set of visual degradations of image frames;

based on the mapping, determining, by the electronic device, a score for each visual degradation of the set of visual degradations; and identifying, by the electronic device, the at least one visual degradation in the at least one image frame with higher scores.

5. The method of claim 1, wherein the modifying of the visual quality factor further comprises:

embedding, by the electronic device, the at least one image frame with the modified visual quality factor into the at least one received image frame.

6. The method of claim 1, wherein the sharpening of the edges of the foreground object comprises:

performing, by the electronic device, low pass filtration and high pass filtration on the foreground object;

determining, by the electronic device, a horizontal boundary, a vertical boundary, and a diagonal boundary of the filtered foreground object;

segmenting, by the electronic device, the at least one image frame into a plurality of segments;

detecting, by the electronic device, edges of the foreground object in each segment;

sharpening, by the electronic device, the edges corresponding to the contrast of the background of the at least one image frame; and merging, by the electronic device, the horizontal boundary, the vertical boundary, and the diagonal boundary of the foreground object with sharpened edges into the at least one image frame.

7. The method of claim 1, wherein the adjusting of the brightness level of the at least one image frame comprises:

identifying, by the electronic device, the optimum reference ambient light value of the electronic device from an ambient light sensor of the electronic device;

determining, by the electronic device, maximum and minimum channels of the at least one image frame by applying maximum and minimum local red-green-blue (RGB) patches on the foreground object;

determining, by the electronic device, a difference of a current ambient light value and the optimum reference ambient light value based on the context of the electronic device; and based on the difference of the current ambient light value and the optimum reference ambient light value, modifying, by the electronic device, the maximum and minimum channels.

8. The method of claim 1, wherein the adjusting of the position of pixels in the at least one image frame comprises:

analyzing, by the electronic device, each pixel of a blurred object;

plotting, by the electronic device, pixel intensity against a pixel position for every pixel in a graph; and adjusting, by the electronic device, one or more pixel positions at high slope points in the graph to remove the blur motion effect in the at least one image frame.

9. An electronic device for enhancing image quality, the electronic device comprising:

a memory;
a display;
a processor; and a visual quality factor controller coupled to the memory and the processor, the visual quality factor controller being configured to:

receive at least one image frame from a network, based on the receiving of the at least one image frame from the network, monitor a network parameter and determine a context of the electronic device, the determining of the context including determining a level of ambient light around the electronic device, a level of brightness of the display, a level of display resolution, and a level of system resources, determine a level of a value of the monitored network parameter based on a threshold value, based on the level of the value of the monitored network parameter and the determined context of the electronic device including the determined level of ambient light around the electronic device, the determined level of brightness of the display, the determined level of display resolution, and the determined level of system resources, identify at least one visual degradation in the at least one image frame, and based on the at least one visual degradation in the at least one image frame, modify a visual quality factor of the at least one image frame, wherein, in the modifying of the visual quality factor of the at least one image frame, the visual quality factor controller is further configured to:

based on the at least one visual degradation, detect the visual quality factor, the visual quality factor comprising edges of a foreground object, a brightness level, and a blur motion effect of the at least one image frame, sharpen the edges of the foreground object, the edges corresponding to a contrast of a background of the at least one image frame, adjust the brightness level of the at least one image frame based on an optimum reference ambient light value, and adjust position of pixels in the at least one image frame affected by the blur motion effect.

10. The electronic device of claim 9, wherein the network parameter comprises at least one of a bit rate, a frame rate, a packet loss rate, a bandwidth, a buffering rate, or a latency.

11. The electronic device of claim 9, wherein the at least one visual degradation comprises flickering, jerkiness, floating, blocking, motion blurring, color bleeding, ringing, or pixelating.

12. The electronic device of claim 9, wherein, in the identifying of the at least one visual degradation, the visual quality factor controller is further configured to:

monitor an image frame parameter of the at least one image frame, the image frame parameter comprising at least one of an image compression of the at least one image frame, an average size of the at least one image frame, a resolution of the at least one image frame, network carrying capabilities, or an application of the electronic device used for receiving the at least one image frame;

based on the network parameter and the image frame parameter, estimate at least one distortion in the at least one image frame, the at least one distortion comprising an instantial distortion, a location distortion, or a network distortion;

map the at least one distortion to a set of visual degradations of image frames;

based on the mapping, determine a score for each visual degradation of the set of visual degradations; and identify the at least one visual degradation in the at least one image frame with higher scores.

13. The electronic device of claim 9, wherein, in the modifying of the visual quality factor of the at least one image frame, the visual quality factor controller is further configured to:
embed the at least one image frame with the modified visual quality factor into the at least one image frame.

14. The electronic device of claim 9, wherein, in the performing of the sharpening of the edges of the foreground object, the visual quality factor controller is further configured to:
perform low pass filtration and high pass filtration on the foreground object;
determine a horizontal boundary, a vertical boundary and a diagonal boundary of the filtered foreground object;
segment the at least one image frame into a plurality of segments;
detect edges of the foreground object in each segment;
sharpen the edges corresponding to the contrast of the background of the at least one image frame; and
merge the horizontal boundary, the vertical boundary and the diagonal boundary of the foreground object with sharpened edges into the at least one image frame.

15. The electronic device of claim 9, wherein, in the adjusting of the brightness level of the at least one image frame, the visual quality factor controller is further configured to:
identify the optimum reference ambient light value of the electronic device from an ambient light sensor of the electronic device;
determine maximum and minimum channels of the at least one image frame by applying maximum and minimum local red-green-blue (RGB) patches on the foreground object;
based on the context of the electronic device, determine a difference of a current ambient light value and the optimum reference ambient light value; and
based on the difference of the current ambient light value and the optimum reference ambient light value, modify the maximum and minimum channels.

16. The electronic device of claim 13, wherein, in the adjusting of the position of pixels in the at least one image frame, the visual quality factor controller is further configured to:
analyze each pixel of a blurred object;
plot pixel intensity against a pixel position for every pixel in a graph; and
adjust one or more pixel positions at high slope points in the graph to remove the blur motion effect in the at least one image frame.

17. The electronic device of claim 12, wherein the visual quality factor controller is further configured to:
receive image frame parameters of the at least one image frame and estimate at least one of the location distortion or the instantial distortion in the at least one image frame based on the image frame parameters; and
receive information of the network parameter and estimate the network distortion in the at least one image frame based on the network parameter.

18. The method of claim 1, wherein the system resources include a computational resource, a storage resource, and a network resource for accessing the network.

* * * * *